US008615456B2

(12) United States Patent
Weinstein

(10) Patent No.: US 8,615,456 B2
(45) Date of Patent: *Dec. 24, 2013

(54) ENHANCED SYSTEM AND METHOD FOR MANAGING FINANCIAL MARKET INFORMATION

(75) Inventor: Bernard A Weinstein, Katonah, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,884

(22) Filed: Mar. 5, 2012

(65) Prior Publication Data

US 2012/0166325 A1  Jun. 28, 2012

Related U.S. Application Data

(63) Continuation of application No. 13/026,410, filed on Feb. 14, 2011, now Pat. No. 8,131,618, which is a continuation of application No. 11/425,368, filed on Jun. 20, 2006, now Pat. No. 7,890,396, which is a continuation-in-part of application No. 11/146,663, filed on Jun. 7, 2005, now Pat. No. 7,801,784.

(60) Provisional application No. 60/577,666, filed on Jun. 7, 2004, provisional application No. 60/692,178, filed on Jun. 20, 2005.

(51) Int. Cl.
*G06Q 40/00* (2012.01)
(52) U.S. Cl.
USPC .......... 705/35; 705/34; 705/37; 705/39; 705/76; 705/77; 705/79
(58) Field of Classification Search
USPC .......... 705/34, 35, 37, 39, 76, 77, 79
See application file for complete search history.

(56) References Cited

U.S. PATENT DOCUMENTS 4,322,612 A   3/1982  Lange
4,592,546 A   6/1986  Fascenda et al.
(Continued)

FOREIGN PATENT DOCUMENTS

GB   2 379 616       4/2001
JP   10-21312 A     1/1998
(Continued)

OTHER PUBLICATIONS

Fischer et al. ("Security Analysis and Portfolio Management"; fifth edition; 1991; Prentice Hall; Englewood Cliffs, NJ 07632); ISBN 0-13-799149-5.

(Continued)

*Primary Examiner* — Muriel Tinkler
(74) *Attorney, Agent, or Firm* — Glen R. Farbanish

(57) ABSTRACT

A system and method are provided for managing financial market information. According to certain embodiments, the system includes a computer having a memory, processor, and display. The processor is capable of generating a graphical depiction of the financial market information on the display. The graphical depiction includes a multidimensional representation of a broad range of market information for at least two financial instruments. The graphical depiction resides in a single window on the display. The financial instruments may include multiple different classes of financial instruments, such as treasuries and futures. Different instruments may be selected and information, including basis information, relevant to the selected instruments may be displayed in a second window.

32 Claims, 14 Drawing Sheets

(56) References Cited

U.S. PATENT DOCUMENTS

| | | | |
|---|---|---|---|
| 4,679,143 A | 7/1987 | Hagiwara | |
| 4,749,785 A | 6/1988 | Thiem et al. | |
| 4,760,527 A | 7/1988 | Sidley | |
| 4,764,666 A | 8/1988 | Bergeron | |
| 4,882,473 A | 11/1989 | Bergeron et al. | |
| 5,077,665 A | 12/1991 | Silverman et al. | |
| 5,136,501 A | 8/1992 | Silverman et al. | |
| 5,159,549 A | 10/1992 | Hallman, Jr. et al. | |
| 5,276,312 A | 1/1994 | McCarthy | |
| 5,277,424 A | 1/1994 | Wilms | |
| 5,283,734 A | 2/1994 | Von Kohorn | |
| 5,347,452 A | 9/1994 | Bay, Jr. | |
| 5,375,055 A | 12/1994 | Togher et al. | |
| 5,414,838 A | 5/1995 | Kolton et al. | |
| 5,555,354 A | 9/1996 | Strasnick et al. | |
| 5,575,474 A | 11/1996 | Rossides | |
| 5,632,009 A | 5/1997 | Rao et al. | |
| 5,636,843 A | 6/1997 | Roberts | |
| 5,674,128 A | 10/1997 | Holch | |
| 5,689,651 A | 11/1997 | Lozman | |
| 5,713,793 A | 2/1998 | Holte | |
| 5,713,795 A | 2/1998 | Kohorn | |
| 5,728,002 A | 3/1998 | Hobert | |
| 5,749,785 A | 5/1998 | Rossides | |
| 5,762,552 A | 6/1998 | Vuong et al. | |
| 5,770,533 A | 6/1998 | Franchi | |
| 5,774,878 A | 6/1998 | Marshall | |
| 5,779,549 A | 7/1998 | Walker et al. | |
| 5,791,989 A | 8/1998 | Slinkman | |
| 5,800,268 A | 9/1998 | Molnick | |
| 5,842,921 A | 12/1998 | Mindes et al. | |
| 5,946,666 A | 8/1999 | Nevo et al. | |
| 5,966,139 A | 10/1999 | Anupam et al. | |
| 6,004,211 A | 12/1999 | Brenner et al. | |
| 6,014,627 A | 1/2000 | Togher et al. | |
| 6,073,115 A | 6/2000 | Marshall | |
| 6,112,189 A * | 8/2000 | Rickard et al. | 705/36 R |
| 6,126,543 A | 10/2000 | Friedman | |
| 6,135,881 A | 10/2000 | Abbott et al. | |
| 6,151,610 A | 11/2000 | Senn et al. | |
| 6,188,403 B1 | 2/2001 | Sacerdoti et al. | |
| 6,222,540 B1 | 4/2001 | Sacerdoti | |
| 6,224,486 B1 | 5/2001 | Walker et al. | |
| 6,236,900 B1 | 5/2001 | Geiger | |
| 6,241,608 B1 | 6/2001 | Torango | |
| 6,272,474 B1 | 8/2001 | Garcia | |
| 6,321,212 B1 | 11/2001 | Lange | |
| 6,400,366 B1 | 6/2002 | Davies et al. | |
| 6,435,968 B1 | 8/2002 | Torango | |
| 6,443,841 B1 | 9/2002 | Rossides | |
| 6,456,982 B1 | 9/2002 | Pilipovic | |
| 6,464,583 B1 | 10/2002 | Kidron | |
| 6,493,681 B1 | 12/2002 | Tertitski et al. | |
| 6,508,710 B1 | 1/2003 | Paravia et al. | |
| 6,527,270 B2 | 3/2003 | Maksymec et al. | |
| 6,611,808 B1 | 8/2003 | Preti et al. | |
| 6,629,890 B2 | 10/2003 | Johnson | |
| 6,684,190 B1 | 1/2004 | Powers et al. | |
| 6,707,454 B1 | 3/2004 | Barg et al. | |
| 6,712,695 B2 | 3/2004 | Mothwurf et al. | |
| 6,792,615 B1 | 9/2004 | Rowe et al. | |
| 6,811,488 B2 | 11/2004 | Paravia et al. | |
| 6,839,686 B1 | 1/2005 | Galant | |
| 6,990,238 B1 | 1/2006 | Saffer et al. | |
| 6,993,504 B1 | 1/2006 | Friesen et al. | |
| 7,042,471 B2 | 5/2006 | Glass et al. | |
| 7,043,449 B1 | 5/2006 | Li et al. | |
| 7,068,267 B2 | 6/2006 | Meanor et al. | |
| 7,069,056 B2 | 6/2006 | Iwata et al. | |
| 7,079,142 B2 | 7/2006 | Chiu et al. | |
| 7,113,190 B2 | 9/2006 | Heaton | |
| 7,181,423 B2 | 2/2007 | Blanchard et al. | |
| 7,341,517 B2 | 3/2008 | Asher et al. | |
| 7,376,608 B1 | 5/2008 | Dellinger et al. | |
| 7,383,218 B1 | 6/2008 | Oros | |
| 7,751,584 B2 | 7/2010 | Zimmer et al. | |
| 7,801,784 B2 | 9/2010 | Bandman et al. | |
| 7,890,396 B2 | 2/2011 | Weinstein | |
| 7,937,309 B2 | 5/2011 | Bandman et al. | |
| 8,088,000 B2 | 1/2012 | Ginsberg et al. | |
| 8,117,068 B2 | 2/2012 | Shuster et al. | |
| 8,131,618 B2 | 3/2012 | Weinstein | |
| 2001/0004609 A1 | 6/2001 | Walker et al. | |
| 2001/0014874 A1 | 8/2001 | Iida et al. | |
| 2001/0030395 A1 | 10/2001 | Sunday | |
| 2001/0031663 A1 | 10/2001 | Johnson | |
| 2002/0004774 A1 | 1/2002 | Defarlo | |
| 2002/0026404 A1 | 2/2002 | Thompson | |
| 2002/0049975 A1 | 4/2002 | Thomas et al. | |
| 2002/0055899 A1 | 5/2002 | Williams | |
| 2002/0070937 A1 | 6/2002 | Bertram et al. | |
| 2002/0073017 A1 | 6/2002 | Robertson | |
| 2002/0073021 A1 | 6/2002 | Ginsberg et al. | |
| 2002/0094869 A1 | 7/2002 | Harkham | |
| 2002/0099640 A1 | 7/2002 | Lange | |
| 2002/0111761 A1 | 8/2002 | Edgecombe et al. | |
| 2002/0120551 A1 | 8/2002 | Jones, III | |
| 2002/0130868 A1 | 9/2002 | Smith | |
| 2002/0133449 A1 * | 9/2002 | Segal et al. | 705/37 |
| 2002/0147670 A1 | 10/2002 | Lange | |
| 2002/0147671 A1 | 10/2002 | Sloan et al. | |
| 2002/0151365 A1 | 10/2002 | Walker et al. | |
| 2002/0152150 A1 | 10/2002 | Cooper et al. | |
| 2002/0155884 A1 | 10/2002 | Updike | |
| 2002/0155885 A1 | 10/2002 | Shvili | |
| 2002/0188546 A1 | 12/2002 | Tang | |
| 2002/0194102 A1 | 12/2002 | Suganuma | |
| 2002/0194114 A1 | 12/2002 | Erdmier | |
| 2003/0009399 A1 | 1/2003 | Boerner | |
| 2003/0009411 A1 | 1/2003 | Ram et al. | |
| 2003/0069834 A1 | 4/2003 | Cutler | |
| 2003/0074292 A1 | 4/2003 | Masuda | |
| 2003/0087701 A1 | 5/2003 | Paravia et al. | |
| 2003/0088492 A1 * | 5/2003 | Damschroder | 705/36 |
| 2003/0110120 A1 | 6/2003 | Salehi | |
| 2003/0119579 A1 | 6/2003 | Walker et al. | |
| 2003/0120835 A1 | 6/2003 | Kale et al. | |
| 2003/0139989 A1 | 7/2003 | Churquina | |
| 2003/0190944 A1 | 10/2003 | Manfredi et al. | |
| 2003/0195841 A1 | 10/2003 | Ginsberg et al. | |
| 2004/0027350 A1 | 2/2004 | Kincaid et al. | |
| 2004/0041846 A1 | 3/2004 | Hurley et al. | |
| 2004/0100467 A1 | 5/2004 | Heaton | |
| 2004/0104845 A1 | 6/2004 | McCarthy | |
| 2004/0128157 A1 | 7/2004 | Aquilino et al. | |
| 2004/0128225 A1 | 7/2004 | Thompson et al. | |
| 2004/0133500 A1 | 7/2004 | Thompson et al. | |
| 2004/0193469 A1 | 9/2004 | Amaitis et al. | |
| 2005/0021443 A1 | 1/2005 | Beard et al. | |
| 2005/0044026 A1 | 2/2005 | Leistner | |
| 2005/0075965 A1 | 4/2005 | Cutler | |
| 2005/0075966 A1 | 4/2005 | Duka | |
| 2005/0102208 A1 | 5/2005 | Gudgeon et al. | |
| 2005/0125328 A1 | 6/2005 | Schluetter | |
| 2005/0171881 A1 | 8/2005 | Ghassemieh et al. | |
| 2005/0177498 A1 | 8/2005 | Tenorio | |
| 2005/0209001 A1 | 9/2005 | Moshal | |
| 2005/0228735 A1 | 10/2005 | Duquette | |
| 2005/0234799 A1 | 10/2005 | Hansen et al. | |
| 2005/0234821 A1 | 10/2005 | Benham et al. | |
| 2005/0245305 A1 | 11/2005 | Asher et al. | |
| 2005/0255919 A1 | 11/2005 | Nelson | |
| 2005/0256795 A1 | 11/2005 | Markov et al. | |
| 2005/0256797 A1 | 11/2005 | Tyulyaev | |
| 2005/0261999 A1 | 11/2005 | Rowady, Jr. | |
| 2005/0264472 A1 * | 12/2005 | Rast | 345/30 |
| 2005/0273068 A1 | 12/2005 | Bandman et al. | |
| 2006/0010066 A1 | 1/2006 | Rosenthal et al. | |
| 2006/0059065 A1 | 3/2006 | Glinberg et al. | |
| 2006/0069635 A1 * | 3/2006 | Ram et al. | 705/37 |
| 2006/0095363 A1 | 5/2006 | May | |
| 2006/0111997 A1 | 5/2006 | Abbott et al. | |
| 2006/0155627 A1 | 7/2006 | Horowitz | |
| 2006/0155628 A1 | 7/2006 | Horowitz | |

(56) References Cited

U.S. PATENT DOCUMENTS

| | | |
|---|---|---|
| 2006/0235786 A1 | 10/2006 | DiSalvo |
| 2006/0241949 A1 | 10/2006 | Tobias et al. |
| 2006/0259394 A1 | 11/2006 | Cushing et al. |
| 2006/0259413 A1 | 11/2006 | Friesen et al. |
| 2007/0005481 A1 | 1/2007 | Kedia et al. |
| 2007/0038543 A1 | 2/2007 | Weinstein |
| 2007/0100718 A1 | 5/2007 | Gilbert et al. |
| 2007/0298871 A1 | 12/2007 | Asher et al. |
| 2008/0081684 A1 | 4/2008 | Lutnick et al. |
| 2009/0096165 A1 | 4/2009 | Asher et al. |
| 2011/0145134 A1 | 6/2011 | Bandman et al. |

FOREIGN PATENT DOCUMENTS

| | | |
|---|---|---|
| JP | 2002-215901 | 1/2001 |
| JP | 2002-109226 | 4/2002 |
| JP | 2002-183451 | 6/2002 |
| JP | 2002-230300 | 8/2002 |
| JP | 2002-373042 | 12/2002 |
| JP | 2002-541588 | 12/2002 |
| JP | 2003-515274 | 4/2003 |
| JP | 2003-521076 | 7/2003 |
| JP | 2007-524941 | 8/2007 |
| WO | WO 97/01145 | 1/1997 |
| WO | WO 9701145 A1 * | 1/1997 |
| WO | WO 97/09699 | 3/1997 |
| WO | WO 9709699 A1 * | 3/1997 |
| WO | WO 97/28636 | 8/1997 |
| WO | WO 00/40313 | 7/2000 |
| WO | WO/00/62187 | 10/2000 |
| WO | WO 00/67215 | 11/2000 |
| WO | WO 01/15450 | 3/2001 |
| WO | WO 01/37494 | 5/2001 |
| WO | WO/01/55968 | 8/2001 |
| WO | WO 01/69344 | 9/2001 |
| WO | WO 01/78405 | 10/2001 |
| WO | WO 02/27675 | 4/2002 |
| WO | WO 03/087994 | 10/2003 |
| WO | WO 03087994 * | 10/2003 |
| WO | WO 2005/072506 | 8/2005 |
| WO | WO/2005/109281 | 11/2005 |
| WO | WO/2006/096851 | 9/2006 |

OTHER PUBLICATIONS

Day Trading Stop loss "Stop Loss Placement"—www.geocities.com/daytradingtutor/trading-stop-loss.htm.
"The Most Powerful ATM card on the Planet", http://www.prepaidatm.com, copyright 2001, printed Feb. 19, 2003, 1pg.
"Stop Loss—How to Limit your Spread Bet Liability", @bout spread betting, http:/www.about-spread-betting.com.uk/spread_bet_stop_loss.htm, copyright 2002, printed Feb. 20, 2003, 2pp.
"Prepaid gift card", Southwestmart, http://www.southwestmart.com/giftcard.htm, copyright 2002.
"Longitude, Completing the World's Capital Markets", http://www.longitude.com/index.html, copyright 2003, printed Apr. 10, 2003, 10pp.
Notification of Transmittal of the International Search Report and the Written Opinion of the International Searching Authority for International Application No. PCT/US07/71651; dated Dec. 18, 2007, 8 pp.
Notification of Transmittal of the International Search Report and the Written Opinion of the International Searching Authority for International Application No. PCT/US/06/24170; dated Mar. 14, 2007, 8 pp.
PCT Notification of Transmittal of the International Search Report and Written Opinion; International Application No. PCT/US05/19935; dated Feb. 16, 2007, 8 pp.
Holland (Malcolm Holland), "It's a weird and wonderful world—You can bet on it", QNP, Nov. 27, 1992.
International Search Report for Application No. PCT/US07/79827, mailed Apr. 17, 2008, 2 pp.
USPTO Office Action for U.S. Appl. No. 11/146,663, Dec. 13, 2007 (6 pages).
USPTO Office Action for U.S. Appl. No. 11/146,663, Oct. 3, 2008 (7 pages).
USPTO Office Action for U.S. Appl. No. 11/146,663, Aug. 5, 2009 (10 pages).
USPTO Office Action for U.S. Appl. No. 11/425,368, Apr. 7, 2008 (8 pages).
USPTO Office Action for U.S. Appl. No. 11/425,368, Feb. 19, 2009 (8 pages).
USPTO Examiner Interview Summary for U.S. Appl. No. 11/425,368, Oct. 30, 2009 (3 pages).
USPTO Office Action for U.S. Appl. No. 09/846,025, Aug. 31, 2005 (27 pages).
USPTO Office Action for U.S. Appl. No. 09/846,025, Jun. 23, 2006 (27 pages).
USPTO Office Action for U.S. Appl. No. 09/846,025, May 18, 2007 (12 pages).
USPTO Office Action for U.S. Appl. No. 09/846,025, Dec. 20, 2007 (7 pages).
USPTO Office Action for U.S. Appl. No. 09/846,025, Jul. 9, 2008 (8 pages).
USPTO Office Action for U.S. Appl. No. 09/846,025, Feb. 24, 2009 (8 pages).
USPTO Examiner's Answer to Appeal Brief for U.S. Appl. No. 09/846,025, Jan. 25, 2010 (15 pages).
USPTO Office Action for U.S. Appl. No. 10/404,043, Feb. 14, 2006 (13 pages).
USPTO Office Action for U.S. Appl. No. 10/404,043, Aug. 14, 2006 (9 pages).
USPTO Office Action for U.S. Appl. No. 10/404,043, Oct. 20, 2006 (3 pages).
USPTO Office Action for U.S. Appl. No. 10/404,043, Feb. 5, 2007 (10 pages).
USPTO Office Action for U.S. Appl. No. 10/404,043, Oct. 9, 2007 (13 pages).
USPTO Office Action for U.S. Appl. No. 10/410,197, Jan. 18, 2007 (5 pages).
USPTO Office Action for U.S. Appl. No. 10/410,197, May 10, 2007 (5 pages).
USPTO Notice of Allowance and Fees Due for U.S. Appl. No. 10/410,197, Oct. 17, 2007 (4 pages).
USPTO Office Action for U.S. Appl. No. 11/536,430, Oct. 7, 2008 (8 pages).
USPTO Office Action for U.S. Appl. No. 11/536,430, Sep. 24, 2009 (18 pages).
*Betting on the Weather*, N.Y. Times, published May 21, 1908 (1 page).
Australian Examiner's Report for Application No. 2005253141, dated Jan. 20, 2010 (2 pages).
USPTO Notice of Allowance and Fees Due for U.S. Appl. No. 11/425,368, Mar. 15, 2010 (9 pages).
USPTO Pre-Brief Appeal Conference Decision for U.S. Appl. No. 11/536,430, Apr. 21, 2010 (2 pages).
International Preliminary Report on Patentability for International Application No. PCT/US/06/24170, dated Dec. 24, 2007 (5 pages).
International Preliminary Report on Patentability for International Application No. PCT/US07/71651, dated Dec. 22, 2008 (5 pages).
Supplementary European Search Report for Application No. EP 06785277, mailed Nov. 24, 2008 (4 pages).
European Communication for Application No. EP 06785277, mailed Mar. 6, 2009 (1 page).
Canadian Office Action for Application No. 2407679, mailed Dec. 12, 2008 (5 pages).
UK Examination Report for Application No. GB 0226984.3, dated Sep. 24, 2003 (4 pages).
UK Search Report for Application No. GB 0406872.2, dated Jun. 7, 2004 (4 pages).
UK Examination Report for Application No. GB 0406872.2, dated Nov. 30, 2005 (4 pages).
International Preliminary Report on Patentability for International Application No. PCT/US07/79827, dated Mar. 31, 2009 (4 pages).

(56) References Cited

OTHER PUBLICATIONS

USPTO Notice of Allowance and Fees Due and Examiner Interview Summary for U.S. Appl. No. 11/146,663, Jun. 10, 2010 (11 pages).
Orla O'Sullivan. (May 1997). Back to command & control. American Bankers Association. ABA Banking Journal, 89(5), 34-40. Retrieved May 15, 2010, from ABI/Inform Global. (Document ID: 12254695).
Integrated Real-Time Stock Data Now Free at 3DStockCharts.com. (Jul. 1, 2003). PR Newswire, 1. Retrieved May 15, 2010, from Business Dateline. (Document ID: 353452561).
3DStockCharts Now Free. (Jun. 1, 2004). Business Wire, 1. Retrieved May 15, 2010, from Business Dateline. (Document ID: 644939771).
Canadian Office Action for Application No. 2460367, mailed May 14, 2010 (4 pages).
Australian Examiner's Report for Application No. 2007299959, dated Jun. 2, 2010 (3 pages).
USPTO Office Action for U.S. Appl. No. 12/106,147, May 17, 2010 (6 pages).
International Preliminary Report on Patentability for International Application No. PCT/US05/19935, dated Apr. 3, 2007 (4 pages).
USPTO Office Action for U.S. Appl. No. 12/106,147, Jun. 28, 2010 (6 pages).
International Preliminary Examination Report for International Application No. PCT/US01/13683, dated Mar. 26, 2007 (3 pages).
Declaration for International Application No. PCT/US01/13683, dated Mar. 21, 2002 (3 pages).
USPTO Notice of Allowance and Fees Due and Examiner Interview Summary for U.S. Appl. No. 11/146,663, Aug. 10, 2010 (16 pages).
USPTO Notice of Allowance and Fees Due for U.S. Appl. No. 11/425,368, Sep. 29, 2010 (7 pages).
USPTO Office Action for U.S. Appl. No. 11/850,213, Oct. 7, 2010 (12 pages).
USPTO Office Action for U.S. Appl. No. 12/339,764, Oct. 25, 2010 (12 pages).
USPTO Supplemental Notice of Allowance and Fees Due for U.S. Appl. No. 11/425,368, Dec. 6, 2010 (4 pages).
USPTO Office Action for U.S. Appl. No. 09/846,025, Dec. 6, 2010 (4 pages).
USPTO Examiner Interview Summary for U.S. Appl. No. 12/339,764, Nov. 30, 2010 (12 pages).
Australian Exam Report for Application No. 2006262221, dated Nov. 26, 2010 (2 pages).
USPTO Petition Decision for U.S. Appl. No. 09/846,025, Jan. 30, 2009 (3 pages).
USPTO Office Action for U.S. Appl. No. 09/846,025, Aug. 5, 2010 (2 pages).
USPTO Pre-Brief Appeal Conference Decision for U.S. Appl. No. 09/846,025, Aug. 21, 2009 (4 pages).
USPTO Examiner Interview Summary for U.S. Appl. No. 12/851,620, Oct. 8, 2010 (3 pages).
USPTO Examiner Interview Summary for U.S. Appl. No. 12/851,620, Nov. 4, 2010 (4 pages).
USPTO Examiner Interview Summary and Notice of Allowance and Fees Due for U.S. Appl. No. 12/851,620, Dec. 27, 2010 (14 pages).
USPTO Office Action for U.S. Appl. No. 12/106,147, Jan. 5, 2011 (9 pages).
USPTO Supplemental Notice of Allowability for U.S. Appl. No. 12/851,620, Feb. 16, 2011 (4 pages).
USPTO Office Action for U.S. Appl. No. 11/850,213, Jun. 29, 2011 (2 pages).
European Communication and Extended Search Report for Application No. EP 07853670.3, mailed May 12, 2011 (6 pages).
Japanese Office Action with English Translation for Application No. 2007-527642, mailed May 17, 2011 (8 pages).
USPTO Office Action for U.S. Appl. No. 13/036,173, Aug. 9, 2011 (12 pages).
USPTO Office Action for U.S. Appl. No. 13/036,173, Aug. 29, 2011 (14 pages).
USPTO Notice of Allowance and Fees Due for U.S. Appl. No. 12/106,147, Aug. 26, 2011 (7 pages).
European Communication and Supplementary Search Report for Application No. 05757385.9, dated Aug. 23, 2011 (7 pages).
USPTO Office Action for U.S. Appl. No. 09/846,025, Oct. 19, 2011 (7 pages).
U.S. Appl. No. 60/201,038, filed May 1, 2000, Ginsberg et al.
U.S. Appl. No. 60/577,666, filed Jun. 7, 2004, Bandman et al.
U.S. Appl. No. 60/692,178, filed Jun. 20, 2005, Bandman et al.
Japanese Office Action with English Translation for Application No. 2008-518358, mailed Nov. 29, 2011 (9 pages).
USPTO Notice of Allowance and Fees Due and Examiner Interview Summary for U.S. Appl. No. 13/026,410, Sep. 23, 2011 (14 pages).
Canadian Exam Report for Application No. 2664753, dated Oct. 19, 2011 (3 pages).
USPTO Office Action for U.S. Appl. No. 13/036,173, Jul. 10, 2012 (13 pages).
Japanese Office Action with English Translation for Application No. 2007-527642, mailed Mar. 13, 2012 (4 pages).
Handout for Briefing for Upcoming Futures and Options Trading System Participants, Japan, Toyko Stock Exchange, Operational System Division, Sep. 1997, pp. 1-18.
USPTO Office Action for U.S. Appl. No. 09/846,025, Apr. 30, 2012 (11 pages).
USPTO Office Action for U.S. Appl. No. 09/846,025, Jul. 16, 2012 (9 pages).
USPTO Office Action for U.S. Appl. No. 13/338,539, Aug. 27, 2012 (7 pages).
Canadian Office Action for Application No. 2407679, mailed Mar. 23, 2012 (3 pages).
USPTO Office Action for U.S. Appl. No. 11/850,213, Jun. 1, 2012 (15 pages).
USPTO Office Action for U.S. Appl. No. 11/850,213, Dec. 6, 2012 (3 pages).
Canadian Office Action for Application No. 2460367, mailed Apr. 20, 2012 (4 pages).
Japanese Office Action with English Translation for Application No. 2009-530621, mailed Apr. 18, 2012 (8 pages).
USPTO Office Action for U.S. Appl. No. 13/338,539, Mar. 13, 2013 (10 pages).
USPTO Office Action for U.S. Appl. No. 11/850,213, Feb. 6, 2013 (2 pages).
USPTO Notice of Allowance and Fees Due for U.S. Appl. No. 09/846,025, Apr. 23, 2013 (13 pages).
USPTO Office Action for U.S. Appl. No. 13/036,173, May 17, 2013 (10 pages).
Japanese Office Action with English Translation for Application No. 2009-530621, mailed Feb. 6, 2013 (4 pages).
Canadian Office Action for Application No. 2569397, mailed Apr. 25, 2013 (3 pages).
European Office Action for Application No. 05757385.9, dated Mar. 22, 2013, 7 pages.
USPTO Notice of Allowance and Fees Due for U.S. Appl. No. 11/536,430, Jun. 13, 2013 (6 pages).
USPTO Office Action for U.S. Appl. No. 13/609,427, Jun. 5, 2013, 9 pages.
Canadian Office Action for Application No. 2611000, mailed Jul. 22, 2013 (2 pages).
USPTO Notice of Allowance and Issue Fees Due for U.S. Appl. No. 13/338,539, Sep. 24, 2013 (8 pages).
Canadian Office Action for Application No. 2460367, mailed Sep. 16, 2013 (2 pages).
USPTO Office Action for U.S. Appl. No. 11/850,213, Oct. 1, 2013 (13 pages).

\* cited by examiner

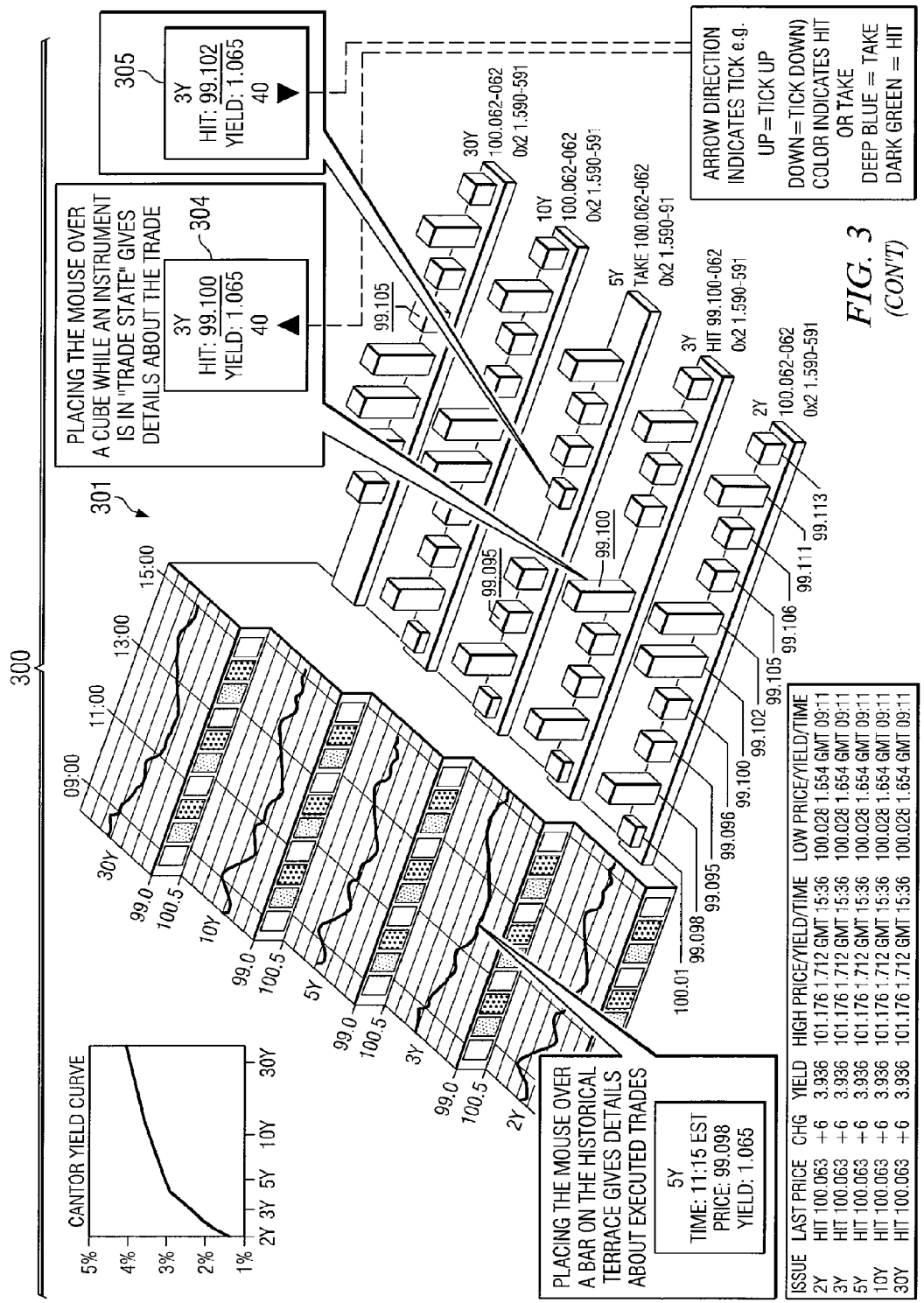
FIG. 3 (CON'T)

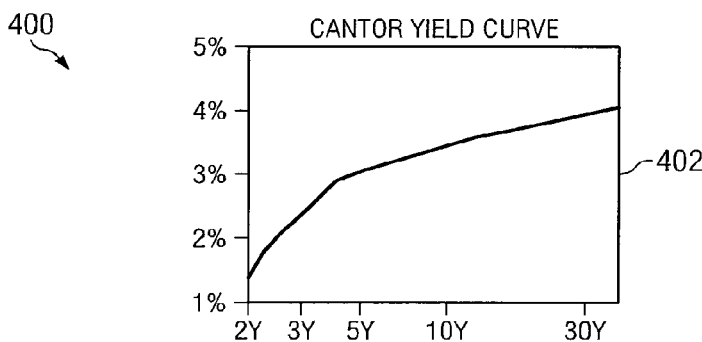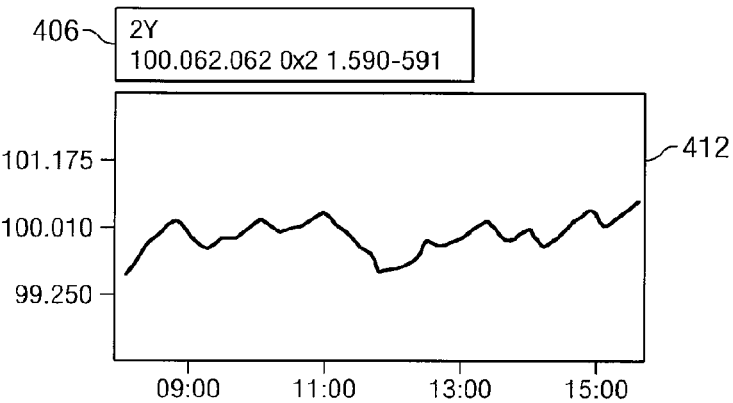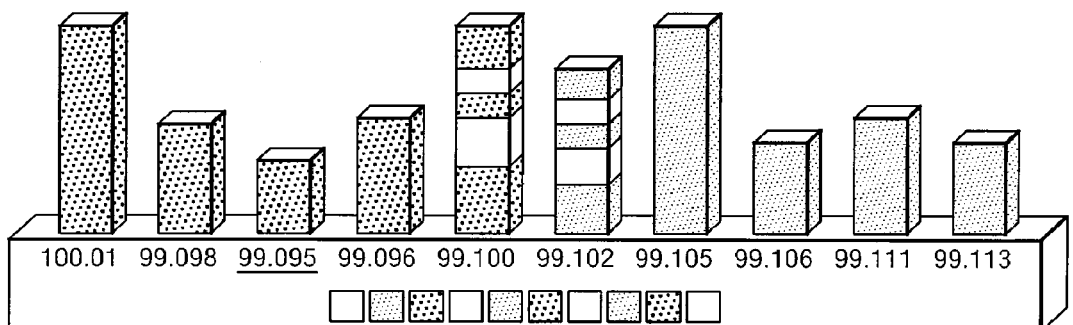
FIG. 4

|  |  |  | △ Last | Net | High | Low | Open |
|---|---|---|---|---|---|---|---|
| 2Y | 99.227 x 99 230 | 1 x 2 | 3.526 x 3.522 | 99.230 | 2 | 99.230 | 99.227 | 99.230 |
| 3Y | 99.055 x 99 057 | 1 x 4 | 3.673 x 3.670 | 99.055 | -5 | 99.055 | 99.050 | 99.052 |
| 5Y | 98.060 x 98 065 | 12 x 15 | 3.905 x 3.902 | 98.062 | -7 | 98.065 | 98.052 | 98.060 |
| 10Y | 97.270 x 97 275 | 18 x 3 | 4.268 x 4.266 | 97.270 | -5 | 97.285 | 97.240 | 97.270 |
| 30Y | 111.050 x 111 070 | 1 x 1 | 4.632 x 4.628 | 111.070 | 45 | 111.070 | 110.310 | 110.310 |
| TUA | 103.252 x 103 260 | 200 x 12 |  | 103.260 | 2 | 103.260 | 103.252 | 103.257 |
| FVA | 107.305 x 107 315 | 1099 x 12 |  | 107.310 | -5 | 108.000 | 107.295 | 108.000 |
| TYA | 110.140 x 110 150 | 670 x 230 |  | 110.145 | 5 | 110.155 | 110.120 | 110.135 |
| USA | 113.10 x 113 12 | 306 x 546 |  | 113.11 | 3 | 113.12 | 113.06 | 113.06 |

| Market View | | Bid/Ask Yield | Last Price | Change | Last Yield | Hi Price | Lo Price | Close | Volume |
|---|---|---|---|---|---|---|---|---|---|
| usg_02Y | 99.20+-206  168x77 | 3.692-687 | 99.206 | 0.01+ | 3.687 | 99.206 | 99.176 | 99.192 | |
| usg_03Y | 100.000-002  16x71 | 3.749-746 | 100.000 | 0.02 | 3.749 | 100.002 | 99.27+ | 99.300 | |
| usg_05Y | 98.29+-296  11x24 | 3.864-863 | 98.29+ | 0.022 | 3.864 | 98.302 | 98.220 | 98.272 | |
| usg_10Y | 100.100 HIT  2 | 4.086-084 | 100.100 | 0.06 | 4.086 | 100.120 | 99.290 | 100.040 | |
| usg_30Y | 115.070-07+  1x1 | 4.381-380 | 115.07+ | 0.13+ | 4.380 | 115.090 | 114.100 | 114.260 | |
| 2Y Sep 05 | 103.230-230  1166x295 | | 103.230 | 0.01+ | | 103.230 | 103.196 | 103.21+ | 50,252 |
| 5Y Sep 05 | 108.090-10+  1917x997 | | 108.10+ | 0.030 | | 108.110 | 108.02+ | 108.07+ | 290,570 |
| 10Y Sep 05 | 112.190-200  871x461 | | 112.190 | 0.07+ | | 112.200 | 112.060 | 112.120 | 589,891 |
| 30Y Sep 05 | 116.210-220  1185x97 | | 116.210 | 0.13 | | 116.240 | 116.010 | 116.080 | 233,596 |

*FIG. 9*
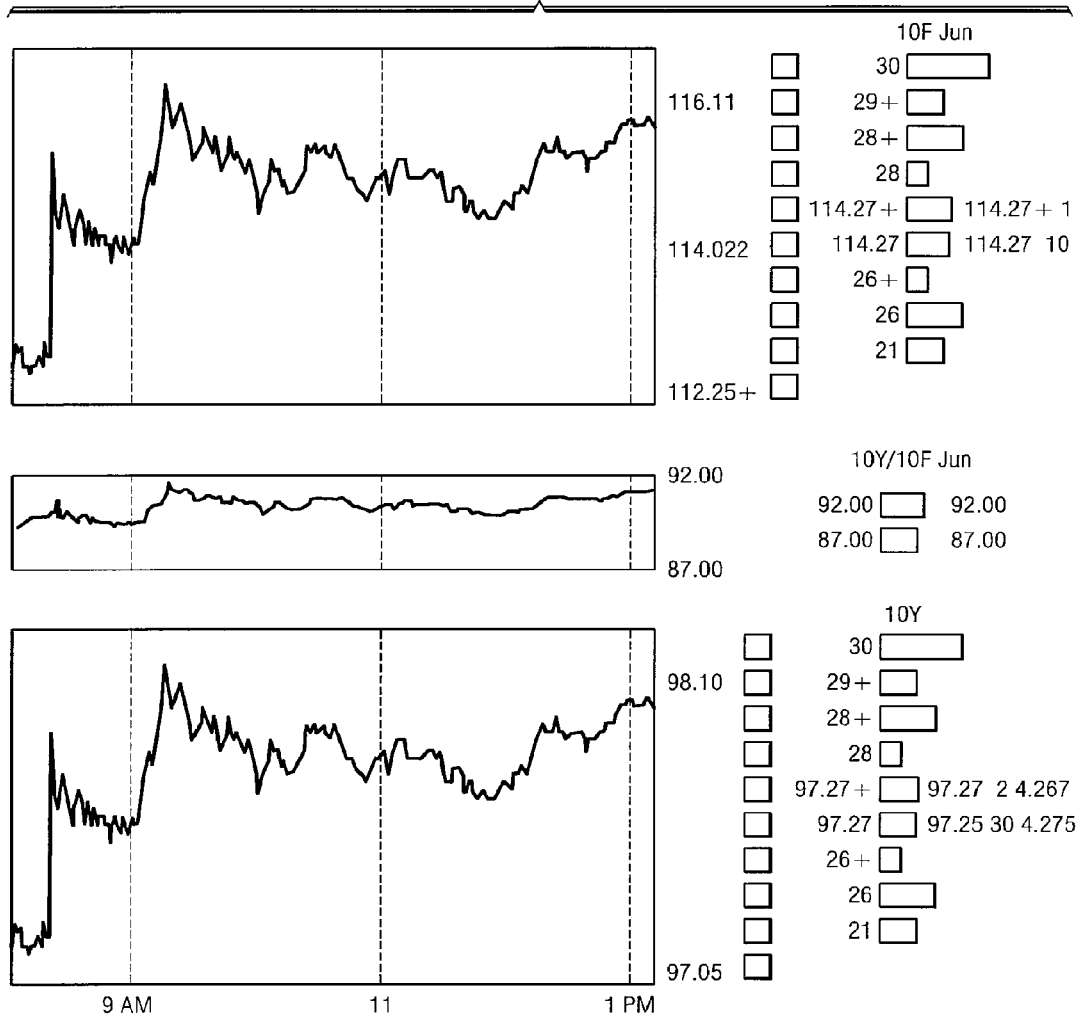
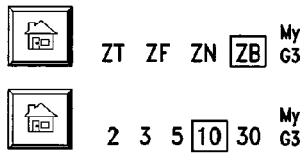

FIG. 10

| 14:05 07JAN04 | CANTOR FITZGERALD | | | | | | | CANTORS | |
|---|---|---|---|---|---|---|---|---|---|
| | Price | Yield | Size | StkB | StkA | Last/Hi/Lo | Size | Yield |
| 2Y | 100.106 - 100.11+ | 1.701-688 | 11X28 | --- | --- | --- | --- | --- |
| > | 100.102 - 100.136 | | 5X4 | < 1 | 25 | HIT 100.112 | 5 | 1.692 |
| > | 99.230 - | | 1X | < 10 | 1 | HI 100.11+ | GMT | 13:37 |
| > | - | | X | < | 2 | LO 100.022 | GMT | 06:00 |
| 3Y | TAK 101.110  10 | TAK 2.134 | 0X8 | --- | --- | --- | --- | --- |
| > | 101.096 - 101.11+ | | 5X7 | < | 3 | TAK 101.110 | 10 | 2.143 |
| > | 101.09+ - | | 6X | < | 5 | HI 101.110 | GMT | 13:32 |
| > | 101.090 - | | 4X | < | | LO 100.276 | GMT | 06:56 |
| 5Y | 100.222 - 100.232 | 3.099-092 | 5X100 | --- | --- | --- | --- | --- |
| > | 100.220 - 100.23+ | | 4X4 | < 3 | 39 | TAK 100.232 | 131 | 3.092 |
| > | 100.216 - 100.236 | | 4X4 | < 2 | 35 | HI 100.232 | GMT | 14:03 |
| > | 100.21+ - 100.240 | | 2X17 | < | 26 | LO 99.290 | GMT | 06:00 |
| 10Y | 101.010 - 101.01+ | 4.121-119 | 514X92 | --- | --- | --- | --- | --- |
| > | 101.00+ - 101.020 | | 5X31 | < 3 | 24 | TAK 101.01+ | 39 | 4.119 |
| > | 100.31+ - 101.070 | | 6X1 | < 11 | 45 | HI 101.01+ | GMT | 14:03 |
| > | 100.310 - | | 3X | < 500 | 23 | LO 99.26+ | GMT | 07:03 |
| 30Y | TAK 105.24+   6 | TAK 4.985 | 0X13 | --- | --- | --- | --- | --- |
| > | 105.22+ - 105.250 | | 4X10 | < | 11 | TAK 105.24+ | 6 | 4.986 |
| > | 105.220 - 105.25+ | | 4X7 | < | 1 | HI 105.25+ | GMT | 13:37 |
| > | 105.21+ - 105.260 | | 5X7 | < | 1 | LO 103.310 | GMT | 08:02 |
| 2WI D05 | - | X | | 5WI 109 | | 3.140-136   3X25 | | |
| 3WI N06 | - | X | | 10WI N13 | | - | X | |
| >, <= Limit Order Book     Stk= Active Market Prices Stack | | | | | | | | |

ENHANCED SYSTEM AND METHOD FOR MANAGING FINANCIAL MARKET INFORMATION

CROSS-REFERENCE TO RELATED APPLICATIONS

This application is a continuation of U.S. patent application Ser. No. 13/026,410 filed Feb. 14, 2011 by Weinstein, and entitled Enhance System and Method for Managing Financial Market Information, which is a continuation of U.S. patent application Ser. No. 11/425,368 filed Jun. 20, 2006 by Weinstein, and entitled Enhance System and Method for Managing Financial Market Information (now U.S. Pat. No. 7,890,396), which (i) is a Continuation-in-Part of U.S. patent application Ser. No. 11/146,663 filed Jun. 7, 2005 by Bandman, et al., and entitled System and Method for Managing Financial Market Information (now U.S. Pat. No. 7,801,784), which claims benefit under 35 U.S.C. §119(e) of U.S. Provisional Application Ser. No. 60/577,666 filed Jun. 7, 2004 by Bandman, et al., and entitled Market Data Viewer System and Method of Operation, and (ii) claims benefit under 35 U.S.C. §119(e) of U.S. Provisional Application Ser. No. 60/692,178 filed Jun. 20, 2005 by Bandman, et al., and entitled Enhanced System and Method for Managing Financial Market Information, all of which are hereby incorporated by reference herein in their entirety.

TECHNICAL FIELD

This invention relates generally to financial market information systems and, more particularly, to a system and method for providing, manipulating, viewing and acting upon financial market information.

BACKGROUND

In recent years, electronic financial market information and trading systems have gained a widespread acceptance. For example, electronic trading systems have been created which facilitate the trading of financial instruments such as stocks, bonds, currency, futures, or other suitable financial instruments. Many of these electronic trading systems use a bid/offer process in which bids and offers are submitted to the systems by a passive side. These bids and offers are hit and lifted (or taken) by an aggressive side. For example, a passive trader may submit a "bid" to buy a particular number of thirty-year U.S. Treasury Bonds at a given price. In response to such a bid, an aggressive trader may submit a "hit" in order to indicate a willingness to sell bonds to the first trader at the given price. Alternatively, a passive side trader may submit an "offer" to sell a particular number of the bonds at the given price, and then the aggressive side trader may submit a "lift" (or "take") in response to the offer to indicate a willingness to buy bonds from the passive side trader at the given price. In such trading systems, the bid, the offer, the hit, and the lift (or take) may be collectively known as "orders." Thus, when a trader submits a bit, the trader is said to be submitting an order.

In general, financial market information systems typically display various pieces of information related to a particular financial market. The pieces of information are usually displayed in separate windows or screens on a monitor. Comparative information, to the extent it is provided, is offered in one or two dimensions. For example, it is common for financial information systems to display two-dimensional graphs of information relating to the market for a single financial instrument. Further, if a user of the system wishes to conduct electronic trading based on the information, the trading activity is typically initiated in a trading application separate from the application providing the financial market information.

SUMMARY

This invention relates generally to financial market information systems and, more particularly, to a system and method for providing, manipulating, viewing and acting upon financial market information. Some embodiments relate to systems, software, and/or graphical user interfaces for the display of market information and options that allow a user to make transactions based on that market information.

In at least one embodiment, a system is provided for displaying financial market information. The system includes a computer having a memory to receive and store financial market information. The computer also has a display and a processor operable to process the financial market information and to execute software to generate a graphical depiction of the financial market information on the display. The graphical depiction has a multidimensional representation, in at least three dimensions, of market information for at least two financial instruments. The graphical depiction resides in a single window on the display, and at least a portion of the displayed financial market information is dynamically updated in real-time.

In another embodiment, software is provided, which is executable by a processor and operable to generate a graphical depiction of financial market information on a display. The graphical depiction includes a multidimensional representation, in at least three dimensions, of market information for at least two financial instruments. The graphical depiction resides in a single window on the display, and at least a portion of the displayed financial market information is dynamically updated in real-time.

In another embodiment, software is provided, which is executable by a processor and operable to generate a graphical depiction of financial market information on a display. The graphical depiction includes a three-dimensional representation of market information for at least two financial instruments. The graphical depiction includes a first component of dynamic, real-time market information in one dimension, and a second component of market information in a second dimension. Representations of the at least two financial instruments are arranged along a third dimension.

The invention has several important technical advantages. Various embodiments of the invention may have none, some, or all of these advantages. Among other things, certain embodiments of the invention provide real-time information for financial instruments (e.g., fixed income securities) in a manner and presentation such that the viewer of the display receives an integrated and easily-understood view of currently updated prices, yields, transactions types and sizes, bid and offer prices, market direction, prevalence of buying and selling interest, price trends and key security relationships and interrelationships. The viewer is provided with the ability to focus on an aggregate measure and retrieve its specific underlying numeric components. This is accomplished in a single display or window in such a way that the single display may give access to a broad array of information that might otherwise require numerous contiguous display windows. Additional information not previously available is provided in a comprehensive graphical format. This simultaneously facilitates the capability to submit a bid to purchase, offer to sell, or to execute a transaction in, each of the securities. The invention also supports display of raw market information with simultaneous mathematical calculations, sophisticated quantitative analytical studies, and 24-hour worldwide transaction capability. The invention facilitates the presentation of financial market information to a user and enables the user to improve the level and speed of understanding that information as compared with known systems. The invention also increases the efficiency of managing the financial market information, as well as the speed and efficiency of transactional activity relating to the financial instruments associated with the information.

Viewing the real-time characteristics of a group of financial instruments in a comprehensive and interactive visual display permits market participants to understand numerous variable and quantitative market dynamics instantly and with precision, including relationships both within the market for a single one of the financial instruments, relationships between the markets for any two or several of the instruments, and comprehensively for the entire group of instruments. The system enables market participants to more effectively execute transactions in any of the instruments through interaction with the same display that is depicting the market information. In addition to facilitating the reading of the quantitative information, the display format and other tools summarize and characterize key market dynamics, providing a simplified framework for a substantially enhanced comprehension of real-time market characteristics and complexities simultaneously with the ability to execute transactions electronically in the respective instruments.

Certain embodiments provide a user interface that is easier and more efficient to use. Certain embodiments facilitate the rapid selection and retrieval of information by presenting a graphical multidimensional representation of market information for financial instruments in a single window. Certain embodiments provide a graphical user interface that enables users to execute information associated with financial instruments represented by the multidimensional representation. Such embodiments are providing a new input tool. Certain embodiments of the invention relate to the manufacture and/or production of a display or a report, such a display or report having a graphical multidimensional representation of market information for two or more financial instruments. The report is a product that may be a printed document or an electronic document.

In certain embodiments there is provided a graphical depiction that includes a first portion representing completed trading activity and a second portion representing current market conditions, such as potential market activity. By displaying such a graphical depiction in a single window a user is able to simultaneously view both completed and current market conditions. This is achieved without the user taking further action (such as opening further windows). In this way the mental and operational burdens on the user are reduced and the user can act more quickly since he is required to take fewer steps to view the information he requires.

In certain embodiments, the invention provides for the display of a multidimensional representation of market information for at least two financial instruments. By doing so, the current invention provides for a technically more reliable system compared to the prior art. This is because the number of queries that are necessary by a user and the number subsequent replies supplied by the system will be reduced. Since data is provided as a multidimensional representation there is more data available to the user in a single display and there will be less of a need for the user and system to perform further operations to obtain required data or to complete an order. Fewer required operations results in a smaller the risk of a failure or delay in an operation. Such failures or delays may be caused by peaks in data traffic over a network.

An embodiment of the invention provides a default base combination of displays designed to answer all the immediate questions of a user such as current prices, volumes etc. The provision of such a default that predicts a user's questions has a number of technical advantages. The default makes efficient use of the display space available on a GUI (so called display "real-estate"). Since the answers to the most likely questions are made readily available, then there is a reduction in the use of the available telecommunications bandwidth because the user is required to interrogate the system less frequently to obtain the answers he needs.

Other technical advantages of the present invention will be readily apparent to one skilled in the art.

BRIEF DESCRIPTION OF THE DRAWINGS

For a more complete understanding of the present invention and for further features and advantages, reference is now made to the following description, taken in conjunction with the accompanying drawings, in which:

FIG. 4 is an example of a market presentation and an associated graphical depiction for displaying financial market information in accordance with an embodiment of the invention;

FIG. 9 is an example of a market presentation and an associated graphical depiction for displaying financial market information in accordance with an embodiment of the invention; and FIG. 10 is an example of a traditional text-based display of financial market information.

DETAILED DESCRIPTION

Figure 1:
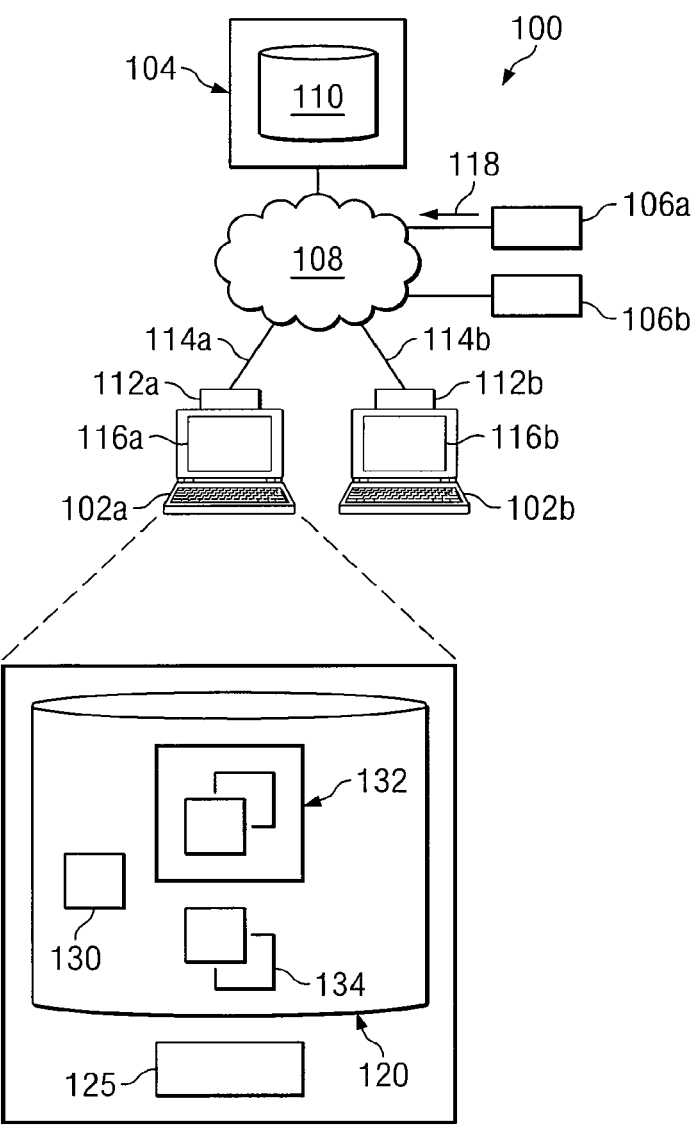
FIG. 1 is a block diagram depicting a system for managing financial market information according to an embodiment of the invention.

In general, certain embodiments of the present invention are directed to presenting financial market information to market participants. According to some embodiments, the invention provides, among other things, electronic displays, which seamlessly integrate the combination of raw data, value-added calculated data, real-time analytical values, graphical displays, and transactional capability, permitting the rapid comprehension and related decision making, market action and decision support required by the market participants. A system provides a means to view the most current and best available raw market data, reliable value-added calculations and analytical and statistical measurements within a framework utilizing various visual display techniques to provide a presentation of current market conditions and dynamics for the securities that a trader or other market participant may be interested in either buying, selling, or assigning a price to for purposes of valuing securities currently held in portfolios. In some embodiments, the system further permits the user to execute transactions in such securities directly and instantly by way of interactivity with the display providing the market information.

Certain embodiments of the invention provide, among other thing, a system for providing, to a market participant, a set of information and transaction displays that depict the current price and yield for one or more financial instruments. Preferably, at least two financial instruments may be represented. Financial instruments include any instrument that may be traded. Although certain embodiments described herein refer to securities, the invention is not limited as such. By way of example only, financial instruments may include securities, treasuries, currency, futures, fixed-income assets, or other similar financial instrument or assets that have a value that changes in response to market conditions. A market participant may include a trader, market maker, analyst, investor, or any other user that views the information. The system also depicts the volume of buy and sell orders including individually-aggregated buy and sell orders that compose the gross volume of securities currently available to buy and sell at the highest currently bid price, and lowest currently offered price, respectively described as the best-bid and the best-offer price. Preferably, this information is provided by a secure worldwide real-time electronic transaction network which aggregates active bids and offers for multiple securities and facilitates the display of the most current and frequently updated best-bid and best-offer prices, as well as current transaction prices for such securities.

Brief identifying information for each security identifies that security at each incidence of its location within the display. Preferably, all instances of the information displayed for that security are real-time, simultaneous, and actionable through user interaction with an interactive transaction inquiry, submission, and execution dialogue window.

The aggregated current best-bid and best-offer orders may be referred to, collectively, as the Active Market Stack™ or simply the order stack. The order stack indicates stacked orders to execute at the current active market, or best prices. Orders comprising the order stack are preferably revealed by shading and highlighting layers in multidimensional (preferably three-dimensional) graphical depiction in a window on an electronic display, such is the monitor of a computer. The graphical depiction may be, for example, in the form of vertical bars. Although certain embodiments described herein refer to particular types and configurations of graphical displays, the invention is not so limited. Any suitable type of representation may be utilized to convey the subject financial market information including, without limitation, pie charts, bar charts, graphs, boxes, colors, gray scales, points, curves, lines, or any other geometric, textual, or pictorial representation of information. Further, certain embodiments may provide certain market information in multiple dimensions (e.g., in at least two dimensions), while other embodiments may provide market information in three, four, or more dimensions.

With respect to the referenced vertical bars, the cumulative height reflects the total aggregate size of the layers within the stacks. Similar vertical bars preferably will be arrayed horizontally and may denote the aggregate volume of current buy and sell orders at specific increments below the current best-bid price and above the current best-offer price. This collection may be referred to as a limit order book. Individually and collectively, the horizontally arrayed vertical bars preferably will give an immediate impression of the prevalence of buying and selling interest on a real-time, continual basis both at and surrounding the current active market price.

Also provided are captions for each of the vertical bars, and cumulative tags for each horizontal line of vertical bars, indicating the real-time data. Current market prices, transaction prices, yields and volumes, and underlying prices at each increment of the limit order book are preferably provided so that all visually presented market characteristics are clearly labeled and numerically defined.

Also provided in horizontal alignment are charts denoting the price histories for a given time period (preferably for a trading day) so as to provide a continually-updated context for current market levels, and a visual display indicating price direction for a predetermined number of transactions in each financial instrument. The charts and the trade direction histories, in one embodiment, are presented in a terrace-step format so as to clearly separate the information for each security, whether separated by sector or maturity.

The interactive visual displays presenting specific security information are further surrounded by tabular and graphical display summaries of execution prices, calculated yields, high and low transaction prices including their times and associated yields, and a real-time updated display of the yield curve in graphical form and superimposed on prior days' histories.

A default base combination of these displays is designed to answer all immediate questions of the market participant as to current prices, volumes, prevalence of buying or selling interest, context within a given time period, current price direction within each maturity and across all securities as a group, price direction and a sense of coming short-term market direction. In addition, each visual display element is further constituted as an aggregate container for underlying values that can be retrieved by scrolling a cursor over the respective element. As this is done, the respective element's individual characteristics, whether components or a summary of its current state, can be viewed as the information is dynamically updated.

In addition, individual displays for each security component of the display are available to permit the market participant to focus on the dynamics of the particular security or maturity sector. In these subordinate individual security displays, visual elements are preferably similarly highlighted to reveal their underlying components either in detailed numeric or status-summary form.

Preferably, any element of the display can be enlarged to highlight the element in greater detail. Also, the entire display can be rotated to permit optimal viewing of the multidimensional elements. At any time, the rotated and enlarged displays can be toggled back to their original default position.

Clicking on any portion of the price, yield or volume listed for a given security preferably will open a transaction window permitting the trader or other qualified user to submit a bid to purchase, or an offer to sell, that security, or to execute a transaction in the security by accepting one of the existing bids or offers, or through the electronic matching of the bid or offer submitted by the trader to the fixed income transaction network with the bid to purchase or offer to sell of another trader or other authorized and qualified user of the financial transaction platform.

Also provided are security and authorization tools necessary to acquire and maintain access to associated secure subscription services, financial credit management services, and transaction management services.

An example embodiment is illustrated in FIG. 1, which is a block diagram illustrating a market information management system 100 including one or more displays 116. At a high level, system 100 is preferably provided as a client/server environment comprising at least one client 102, a server 104, and one or more data providers 106. Although this configuration is provided as an example, any suitable electronic configuration that performs the desired functionality may be utilized. In general, system 100 comprises a system for providing a market participant using client 102 with the ability to view a graphical depiction of financial market information 118 for one or more financial instruments. Preferably, the graphical depiction is provided and viewable in a single window of display 116. The market information 118 may be received from a data provider 106 and stored in a central repository 110 on server 104.

For example, system 100 may comprise a market system that compiles U.S. Treasury benchmark and non-benchmark instrument data, automatically presents the compiled instrument data to a trader via display 116, and dynamically processes any appropriate changes in market information 118. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that certain processing is determined, at least in part, at run-time based on one or more variables.

Server 104 comprises any computer including a central repository 110 and communicably connected to at least one client 102 and/or one data provider 106. For example, server 104 may be a general-purpose personal computer (PC), a Macintosh, a workstation, a Unix-based computer, a server computer, or any other suitable device. FIG. 1 only provides one example of computers that may be used. For example, although FIG. 1 illustrates one server 104, system 100 can be implemented using computers other than servers, as well as a server pool. The present disclosure contemplates computers other than general purpose computers as well as computers without conventional operating systems. As used herein, the term "computer" is intended to encompass a personal computer, workstation, network computer, or any other suitable processing device. Computer server 104 may be adapted to execute any operating system including UNIX, Windows, or any other suitable operating system so long as server 104 remains communicably connected to client 102. According to one embodiment, server 104 may be a remote web server. In short, server 104 may comprise any computer with software and/or hardware in any combination suitable to present client 102 with market information.

Central repository 110 includes a variety of market information 118 from one or more data providers 106. Central repository 110 comprises any physical or logical description of data storage operable to be defined, processed, or retrieved by externally-implemented code. For example, central repository 110 may comprise one or more extensible Markup Language (XML) tables or documents. In another example, central repository 110 may comprise a relational database described in terms of SQL statements or scripts, flat files, Btrieve files, or comma-separated-value (CSV) files. Central repository 110 may comprise a plurality of tables stored on one server 104 or across a plurality of servers 104. Moreover, central repository 110 may be local or remote without departing from the scope of this disclosure. In short, central repository 110 is any data storage comprising at least a subset of market data 118 that is communicably connected to at least one client 102.

Additionally, the present invention contemplates any suitable configuration for the storage of market information. For example, although FIG. 1 depicts a central repository 110, market information 118 may be stored at any suitable location, such as on client 102.

Each client 102 is preferably a trading workstation or device operable to present a market participant with display 116 via a graphical user interface (GUI). At a high level, illustrated client 102 includes GUI 112, memory 120 and processor 125 and comprises an electronic computing device operable to receive, transmit, process and store any appropriate data associated with system 100. It will be understood that there may be any number of clients 102 coupled to server 104, as illustrated by client 102a and client 102b. Further, "client 102" and "user of client 102" may be used interchangeably without departing from the scope of this disclosure. As used herein, client 102 is intended to encompass a personal computer, workstation, network computer, kiosk, wireless data port, personal data assistant (PDA), one or more processors within these or other devices, or any other suitable processing device. For example, client 102 may comprise a computer that includes an input device, such as a keypad, touch screen, mouse, or other device that can accept information, and an output device that conveys information associated with the operation of server 104 or clients 102, including digital data, visual information, or display 116. Moreover, client 102 may comprise a keyboard customized to match display 116, with each key mapped to a particular component, view, or functionality of display 116. Both the input device and output device may include fixed or removable storage media such as a magnetic computer disk, CD-ROM, or other suitable media to both receive input from and provide output to users of clients 102 through the display 116 by way of, for example, the GUI The GUI may comprise a graphical user interface operable to allow the user of client 102 to interface with system 100 to receive one or more sets of market information from data provider 106. Generally, the GUI provides the user of client 102 with an efficient and user-friendly presentation of data provided by system 100. The GUI may comprise a plurality of frames or views having interactive fields, pull-down lists, and buttons operated by the user. In one embodiment, the GUI presents, in a single window, a graphical depiction of the various market information 118 and receives commands from the user of client 102 via one of the input devices. As illustrated in more detail in FIG. 2A, and as will be described below in great detail, according to certain embodiments, display 116 includes a graphical depiction of a series of limit order books and completed trading information for a plurality of financial instruments.

Display 116 may also be associated with a configuration file, module, or dynamic link library (DLL) operable to store various dynamically configurable or selectable options and parameters. This configuration component may be a distributed file that is managed by an administrator or manager, thereby providing centralized and consistent configuration for a plurality of market participants. It will be understood that "administrator" as used herein is any user with permissions or rights to dynamically configure options for display 116. In other words, each market participant may also be an administrator without departing from the scope of this disclosure. These parameters may be configured during run-time to allow for swift responses to changing trading, regulatory, or other industry conditions. In short, display 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML or XML responses using network 108.

Network 108 facilitates wireless or wireline communication between computer server 104 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Client 102 includes interface 112 for communicating with other computer systems, such as server 104, over network 108 in a client-server or other distributed environment. In certain embodiments, client 102 receives market information 118 from network 108 for storage in memory 120. Generally, interface 112 comprises logic encoded in software and/or hardware in a suitable combination and operable to communicate with network 108 via link 114. More specifically, interface 112 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes at least a market information management application 130, local market data 132, and a transaction application 134, but may also include any other appropriate applications and data, such as a configuration file for use by display 116 and application 130 and 134.

Applications 130 and 134 may include any hardware, software, firmware, or combination thereof operable to receive and process market information 118, present it to market participants through display 116, and enable users to execute transactions associated with the financial instruments represented by the information presented on display 116. When loading or configuring display 116, application 130, for example, may first process the configuration file, whether local or remote, to determine the initial or default parameters of the graphical depiction(s) presented on display 116. Further, application 130 may receive and process requests from the market participant using client 102 via display 116. Trade application 130 may deny, ignore, or communicate an error in response to certain requests based on the configuration file. It will be understood that while applications 130 and 134 are illustrated as single multi-tasked modules, the features and functionality performed by these applications may be performed by multiple modules such as, for example, a data retrieval module and a presentation engine. Moreover, applications 130 and 134 may comprise a child or sub-module of another software module without departing from the scope of this disclosure. In short, application 130 and 134 comprises one or more software modules operable to provide any appropriate processing for presenting, manipulating, and acting upon market information 118 as described herein.

Local market data 132 stores one or more subsets of remote market data 118, such as benchmark and non-benchmark instruments. Local market data 132 may receive a copy of market data 118 through interface 112 or from another process running on client 102 as appropriate. As appropriate, local market data 132 may automatically, dynamically, or manually retrieve or receive market data 118 from central repository 110 at any appropriate time. For example, management application 130 may automatically retrieve a copy of market data 118 in central repository 110 upon initial execution. Further, local market data 132 may be of any suitable format including XML documents, flat files, comma-separated-value (CSV) files, SQL tables, relational database tables, and any other format operable to store at least one subset of market data 118. It will be understood that local market data 132 may be in a format different from the data in central repository 110 or communicated market data 118 so long as it is compatible with display 116 and may be processed by applications 130 and 134.

Display 116 includes a window or windows, as appropriate, to present market information to the user. In one embodiment, market information is presented to the user in a graphical depiction displayed in a single window. In another embodiment, a user may execute transactions in the depicted financial instruments by interacting with elements or objects displayed in the same window as the market information, including interaction with components of the graphical depiction of the information. However, the invention is not so limited and contemplates the use of multiple windows for displaying market information and/or executing transactions corresponding to, or based on, the information.

Client 102 also includes processor 125. Processor 125 executes instructions and manipulates data to perform the operations of client 102 such as, for example, a central processing unit (CPU), an application specific integrated circuit (ASIC) or a field-programmable gate array (FPGA). Although FIG. 1 illustrates a single processor 125 in client 102, multiple processors 125 may be used according to particular needs, and reference to processor 125 is meant to include multiple processors 125 where applicable. In certain embodiments, processor 125 executes one or more processes associated with applications 130 and 134 to present market data 118 communicated from central repository 110 via data providers 106 and to enable a user to conduct transactions in the financial instruments represented by the market data 118.

Data provider 106 typically comprises a third party web server or an enterprise agent residing on a machine operable to communicate at least a portion of market data 118 for storage in central repository 110. It will be understood that data provider 106 may be remote or local. Further, data provider 106 may represent a separate process running on server 104 or client 102 without departing from the scope of this disclosure. Generally, data provider 106 is any hardware, software, or logic operable to provide system 100 with at least a subset of any appropriate market data 118. System 100 may comprise any number of data providers 106, as illustrated by data providers 106a and 106b. For example, a plurality of data providers 106 may be communicably daisy-chained off a master provider 106. Master data provider 106 may compile and verify substantially all of market data 118 and communicate the compiled market data 118 to server 104 upon request or at a scheduled time.

In one aspect of operation, applications 130 and 134 are executed and initialized either automatically, such as when client 102 is powered up, or in response to a command from the user. Application 130 and 134 may determines a default configuration and layout for display 116, retrieves the appropriate market data for the benchmark and non-benchmark instruments from central repository 110 and/or local market data 132, and generates the graphical depiction(s) presented in display 116 based on the default configuration and retrieved data. Application 130 and 134 processes the information presented in display 116 and/or the actions initiated by the user as appropriate.

Figure 2:
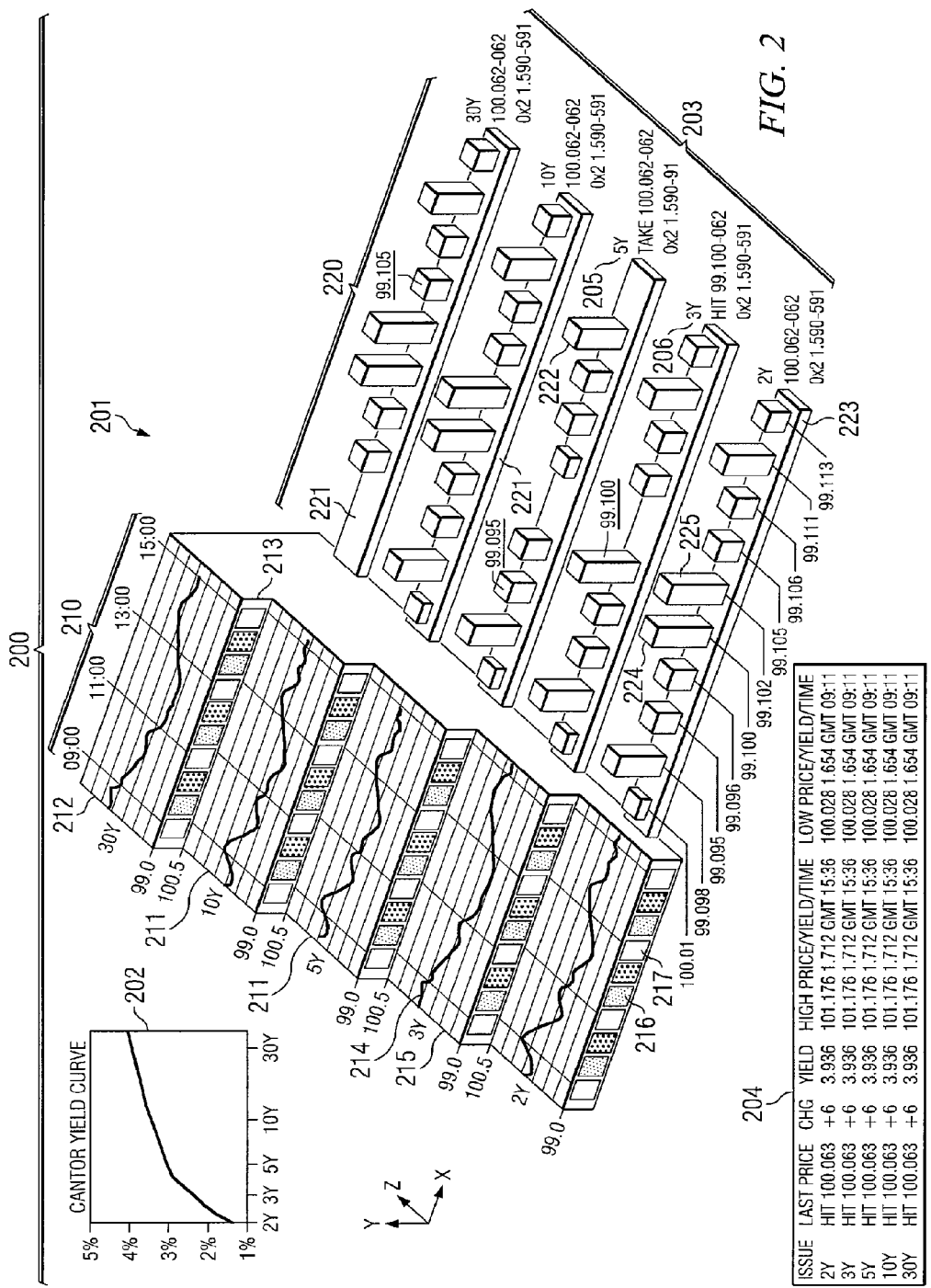
FIG. 2 is an example of a market presentation and an associated graphical depiction for displaying financial market information in accordance with an embodiment of the invention.

As illustrated in FIG. 2, and by way of example only, an embodiment of the present invention provides a market information presentation 200 to a user of client 102. Components of presentation 200 are preferably displayed in a single window on display 116. However, components of presentation 200 may be displayed in multiple windows and/or on multiple displays without departing from the scope of this disclosure.

More specifically, market presentation 200 preferably includes a graphical depiction 201, which comprises a first portion 210 and a second portion 220. First portion 210 represents information regarding completed transactions, bids, offers, or any other activity in connection with the market(s) represented. As shown in FIG. 2, first portion 210 represents intraday trading activity. Second portion 220 represents current market conditions and potential market activity, such as available trading opportunities. Collectively, first and second portions 210 and 220 present a multidimensional representation of market information for at least two financial instruments. Preferably, the entire graphical depiction 201 resides in (i.e., is viewable in) a single window of an electronic display. Preferably, at least one first and second portions 210 and 220 reside in a single window. More preferably, both first and second portions 210 and 220 are viewable in the single window. Although the single-window display is preferably, the disclosure contemplates any other suitable configuration, such as presenting certain portions of the graphical depiction 200 in multiple, different windows.

First portion 210 includes a multidimensional object representing completed, intraday, trading activity. First portion 210 is presented as a terraced, or stepped, three-dimensional object. Each step 211 represents a different financial instrument. In the example illustrated in FIG. 2, there are five steps 211 representing the five different U.S. benchmark treasuries, including 2-Year, 3-Year, 5-Year, 10-Year, and 30-Year treasuries, respectively. It should be noted, as previously described, that the depiction 201 (and, for example, the steps 211), may represent any financial instruments or any other asset or item that may be transacted on an electronic exchange. Each step 211 includes a horizontal section 212 and a vertical section 213. Preferably, the horizontal section 212 is a horizontal plane having dimensions in the x and z directions. Preferably the vertical section 213 is a vertical plane having dimensions in the x and y directions. The various different financial instruments are represented by a progression of steps 211 in the z direction. In other words, the different financial instruments are arranged along the z dimension.

Each horizontal section 212 comprises various information displayed in the form of a graph 214 superimposed on a grid 215. The grid 215 represents transaction price in z direction and time in the x direction. The graph 214 is a depiction of connected data points on the grid over a period of time. The example in FIG. 2 uses a portion of the trading day as the time period. For example, FIG. 2 depicts a time period of from before 9:00 am to slightly after 3:00 pm. Any period of time may be represented, however, including minutes, hours, days, years, etc. Also, multiple time periods may be represented, such as a portion of one day and a portion of another day. More than one graph (not expressly shown) may be included in any given horizontal section 212. Each graph may represent different time periods or any other suitable information, which may be desirable to present to a market participant. It should be noted that the representation of graph 214, or any other two-dimensional graphic, may be made three-dimensional (or with a greater number of dimensions) in order to display even more information (such as size or volume in the case of graph 214).

Each vertical section 213 also represents completed trading information as well. In FIG. 2, each vertical section 213 includes a tick strip 216, which is an indication of price direction for a predetermined number of trades, the price direction for each of the respective trades being represented by an indicator 217. The tick strips shown display price direction for ten trades, but any suitable number of trades may be used. Preferably, the number of trades represented by a tick strip is in the range of from five to fifteen. This provides a market participant with a manageable and useful number of previous price directions from which to draw conclusions about how recent price directions affect the decision to purchase or sell a particular security associated with the tick strip being viewed. More preferably, the number of indicators, or ticks, is in the range of from eight to twelve. The price direction is indicated by the use of different colors for each indicator 217. Although not expressly shown in FIG. 2, the colors may include yellow for "no change," green for an "upward" price direction, and red for a "downward" price direction. However, any graphical representation may be used. For example, price direction might shown by upward and downward arrows and flat bars for "no change." As another example, price direction may be indicated by gray-scale as oppose to colors. Alternatively, the price direction information may be represented by textual or numeric information.

Therefore, as shown, a graph 214 represents completed trading information over a first period of time and a tick strip 216 represents completed trading information over a second period of time. The second period of time is shorter than the first period of time and is a subset of the first period of time. Also, as discussed, the graph 214 represents price-amount information and the tick strip 216 represents price-direction information. Thus, the graph and tick strips represent different information over different time periods.

Second portion 220 includes a plurality of multidimensional objects representing the entire current market for the five benchmark treasuries. Second portion 220 comprises a plurality of instrument slabs 221. Each slab 221 represents a financial instrument. As shown in FIG. 2, there are five slabs 221 representing the five benchmark treasuries. Preferably, each slab 221 corresponds with a step 211. That is, a step 211 and a corresponding slab 221 both represent the same financial instrument.

Each slab 221 has disposed thereon a series of 3D vertical bars 222. Each of the vertical bars is known as a stack. The stack represents a volume of security orders (either for sale or for purchase) at a given price. A series of stack along a given slab is known as a limit order book for the particular security. Each slab has a center point 223. The stack immediately to one side of center point (e.g., stack 224) represents the best-bid price, or the best price for which users are willing to pay for the security. The stack immediately to other side of center point 223 (e.g., stack 225) represents the best ask price, or the best price for which users are willing to sell the security. The center point may be known, therefore, as the best bid/ask, or BBA point. The pair of stacks straddling the BBA point may be known as the BBA stacks. Preferably, the BBA stacks illustrate additional information in the form of layers. The layers indicate different order volumes in a queue at the best bid/ask prices, respectively. However, any vertical bar 222 may be configured in this manner.

Thus, second portion 220 includes a plurality of slabs 221, each of which comprises a plurality of vertical bars or stacks 222 arranged along a given dimension. In FIG. 2, the stacks 222 for a given slab 221 are arranged along the x dimension. Similar to first portion 210, the various different financial instruments are represented by a progression of slabs 221 in the z direction. In other words, the different financial instruments are arranged along the z dimension. As represented by stacks 222 price information is provided in the x direction and volume information is provided in the y direction. As shown in FIG. 2, the price information for each stack 222 is provided numerically superimposed on the respective slabs 221, below the respective stacks 222.

Market presentation 201 may also include certain collateral information. As shown in FIG. 2, presentation 201 includes yield curve indicator 202, trade status indicators 203, and quote board 204. Yield curve indicator 202 shows yield curve information for the plurality of financial instruments. As shown in FIG. 2, yield curve information is shown for the five benchmark treasuries. Although only one curve is shown, the indicator 202 may show multiple curves representing multiple time periods.

Trade status indicators include trade state indicators 205 and BBA instrument quotes 206. Trade state indicators 205 are displayed when the particular security is in a trade state. The trade state indicator provides information such as price information, volume information, and hit/take information. Hit/take information indicates whether the trade was a hit or take (i.e., a sale at a best-offer price, or purchase at a best-bid price, respectively).

Quote board 204 displays current market quote information. In other words, board 204 displays instrument type information (such as 2Y or 3Y treasury), last price information (including a hit/take indication), price change information, yield information, high price/yield/time information, and low price/yield/time information.

Figure 3:
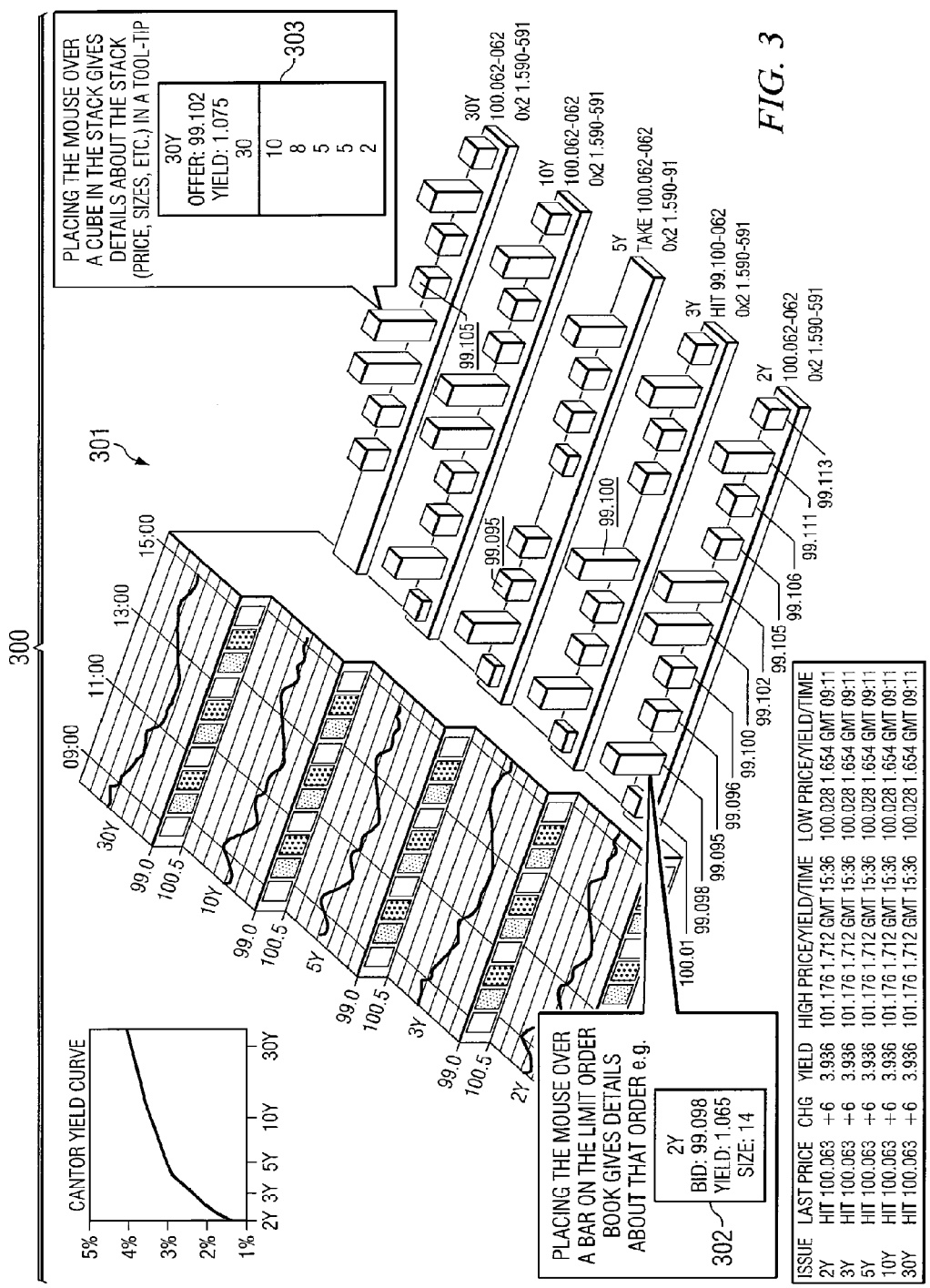
FIG. 3 is an example of a market presentation and an associated graphical depiction for displaying financial market information in accordance with an embodiment of the invention.

FIGS. 3 and 4 illustrate additional aspects of the graphical depictions contemplated by various embodiments of the present invention. For example, as shown in FIGS. 3 and 4, there is hidden information embedded within the graphical depiction 301. The information is preferably viewable by scrolling a cursor over a certain object to cause a dialog box to be presented. For example, as shown in FIG. 3, scrolling the cursor (not expressly shown) over a stack may cause a box 302 to be displayed. Box 302 contains information such as instrument type, bid price, yield, and volume. The box 302 information is the type of information that would preferably be available for a non best-bid/ask stack. Similar information would be available for the ask stacks (i.e., the stacks representing securities being offered for purchase), except that an ask price would be provided instead of a bid price.

Scrolling the cursor over best-bid/ask stacks produces boxes such as box 303. Box 303 includes information such as instrument type, offer price, yield, aggregate volume, and incremental volumes. The incremental volumes represent the respective volumes of each order within the queue of the stack for a single price. For example, in box 303, the incremental volumes are 10, 8, 5, 5, and 2 respectively. The aggregate volume is the sum of the incremental volumes. For example, in box 303, the aggregate volume is 30. Similar information would be displayed in a box corresponding to a best bid stack, except that the bid price instead of the offer, or ask, would be displayed.

Another example of an information box is box 304, which corresponds to a stack while the instrument is in a trade state. Box 304 displays information such as instrument type, hit/take, price, yield, volume, and price direction. Similar information is displayed in box 305 except the hit/take indication is "take," because the trade-state stack that corresponds to box 305 is among the offer orders of the respective limit order book as opposed to the bid orders.

It should be noted that hidden information may be provided in varying levels as desired. Multiple layers may be accessed by "drilling down," for example, to more and more detailed layers. Hidden information may be viewed in any number of configurations such as the illustrated boxes. Other possible configurations include such things as pop-up windows, scroll bars (at the bottom of the screen for example), and audio files. Hidden information, once accessed, may remain on the screen until affirmatively re-hidden, may remain for a predetermined period of time, or may return to a hidden status as the cursor leaves the object associate with the hidden information. The disclosure contemplates any routine by which hidden information is at least initially accessed to be made viewable, and any routine by which the information returns to a hidden state.

In FIG. 4 there is illustrated an example of certain information that may be "broken out" from the base graphical depiction (such as graphical depiction 201 or 301). For example, slab 421 and its associate limit order book have been broken out and displayed in FIG. 4. The market presentation 400 shown in FIG. 4 also includes yield curve 402, quote board 404, instrument quote 406 and trading indicator 412. Indicator 412 corresponds to a top-down view of the horizontal section of one of the steps of the first portion of a graphical depiction (e.g., horizontal section 212).

Any portion of the graphical depiction and collateral information shown in a market presentation may be zoomed, enlarged, broken out, rotated, another otherwise manipulated in order to provide the user with different views of the various pieces of information being illustrated in the respective market presentation.

According to an aspect of certain embodiments, transactions in the financial instruments are enabled. A transaction is accomplished by taking an appropriate step or steps to execute transaction application 134 shown in FIG. 1. The trigger to engage the transaction application can be any suitable trigger, such as clicking on an icon, typing a textual command, pressing a predetermined key or series or combination of keys, and issuing a verbal command to system 100. In at least one embodiment, market presentation or graphical depiction (e.g., market presentation 200 or depiction 201) provide interactive transaction capability. Accordingly, the user may execute a transaction directly from the market presentation display window. This may be accomplished, for example, by scrolling the cursor onto a best-bid/ask stack and clicking a mouse. Then, application 134 presents a transaction dialog box for the user to complete additional information relating to the transaction. A confirmation window would provide the user with the opportunity to confirm the hit or take. According to another aspect, the application 134 and interactive display window cooperate to allow the user to place bid or ask orders.

Figure 5:
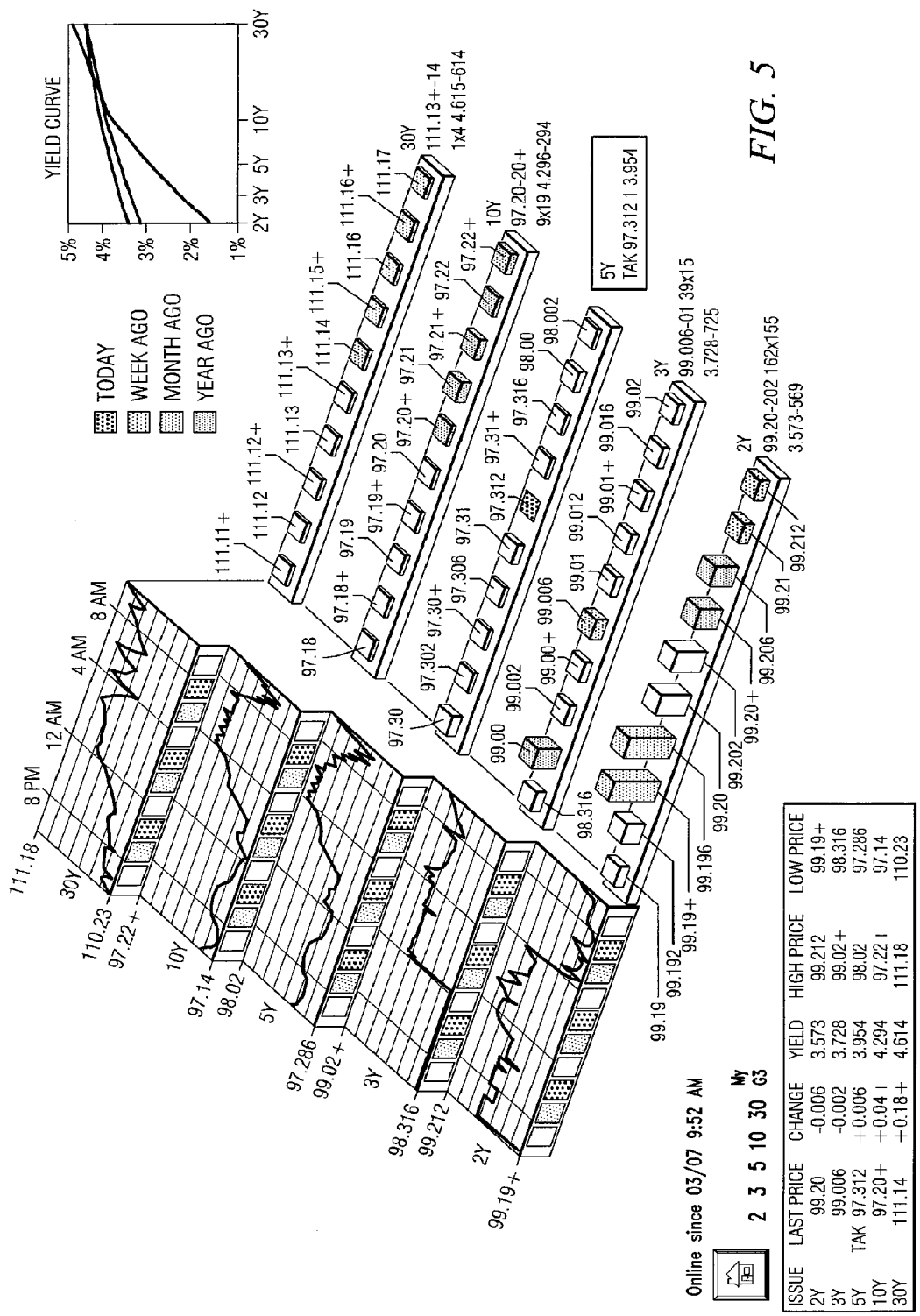
FIG. 5 is an example of a market presentation and an associated graphical depiction for displaying financial market information in accordance with an embodiment of the invention.

FIG. 5 comprises of a screen shot showing a graphical depiction of market information for five financial instruments in a single window on the display. FIG. 5 includes a yield curve indicator with multiple curves for five benchmark treasuries. Each individual curve represents a different time period: today, a week ago, a month ago, and a year ago. The invention, however, is not limited to these four time periods. Instead, a user may customize the time periods according to their own needs.

In another embodiment, a display may also depict market information for futures. The futures information may be graphically depicted in a manner similar to that shown as example embodiments in FIG. 2-4. The futures information may be shown for multiple futures, or a combination of futures and treasuries (or other combinations of financial instruments).

Figure 6:
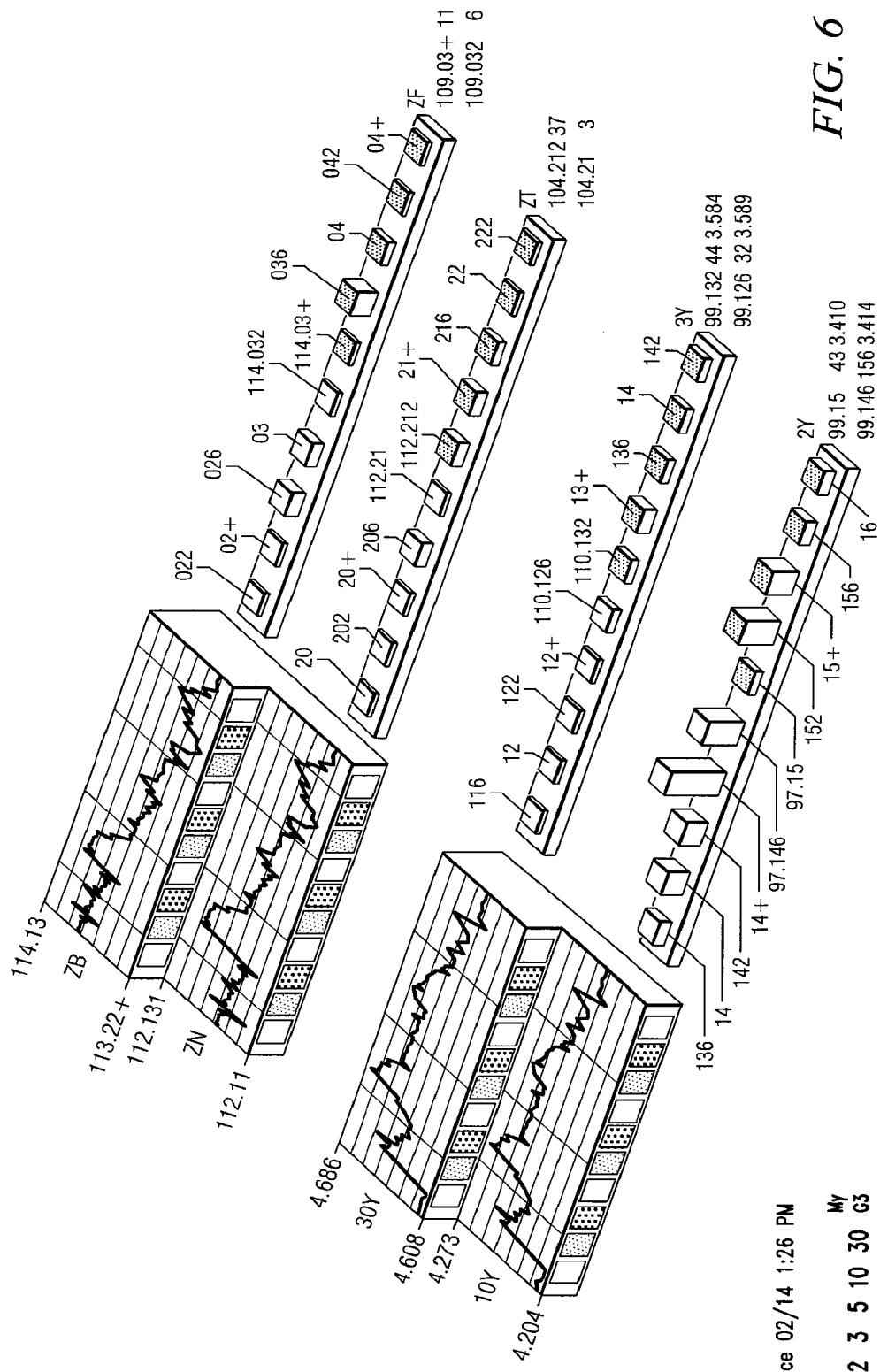
FIG. 6 is an example of a market presentation and an associated graphical depiction for displaying financial market information in accordance with an embodiment of the invention.

Thus, referring to FIG. 2, a graphical depiction includes steps 211 and slabs 221. One or more of these steps and slabs may be replaced with similar steps and slabs representing futures instead of the treasuries indicated in FIG. 2. The information for the futures instruments can include any information desirable for analyzing the futures market and conducting transactions in the futures market. An example of this can be seen in FIG. 6. Instead of showing five financial instruments, all of the same class, the graphical representations of the 2-Year, 3-Year, and 5-Year treasuries have been substituted with futures. Thus, the user is capable of analyzing the intraday price/yield activity for different financial instruments simultaneously and in the same window.

The system also can display comparative information such as basis information. Basis information can include information illustrating the relationship between cash (e.g., treasuries) instruments and futures instruments. Comparative information can also include curve swap information. Curve swap information includes information illustrating the relationship between at least two instruments of the same type, but having different maturities. Comparative information can also include Trade Differences information and Summed Net Change information.

Figure 7A:
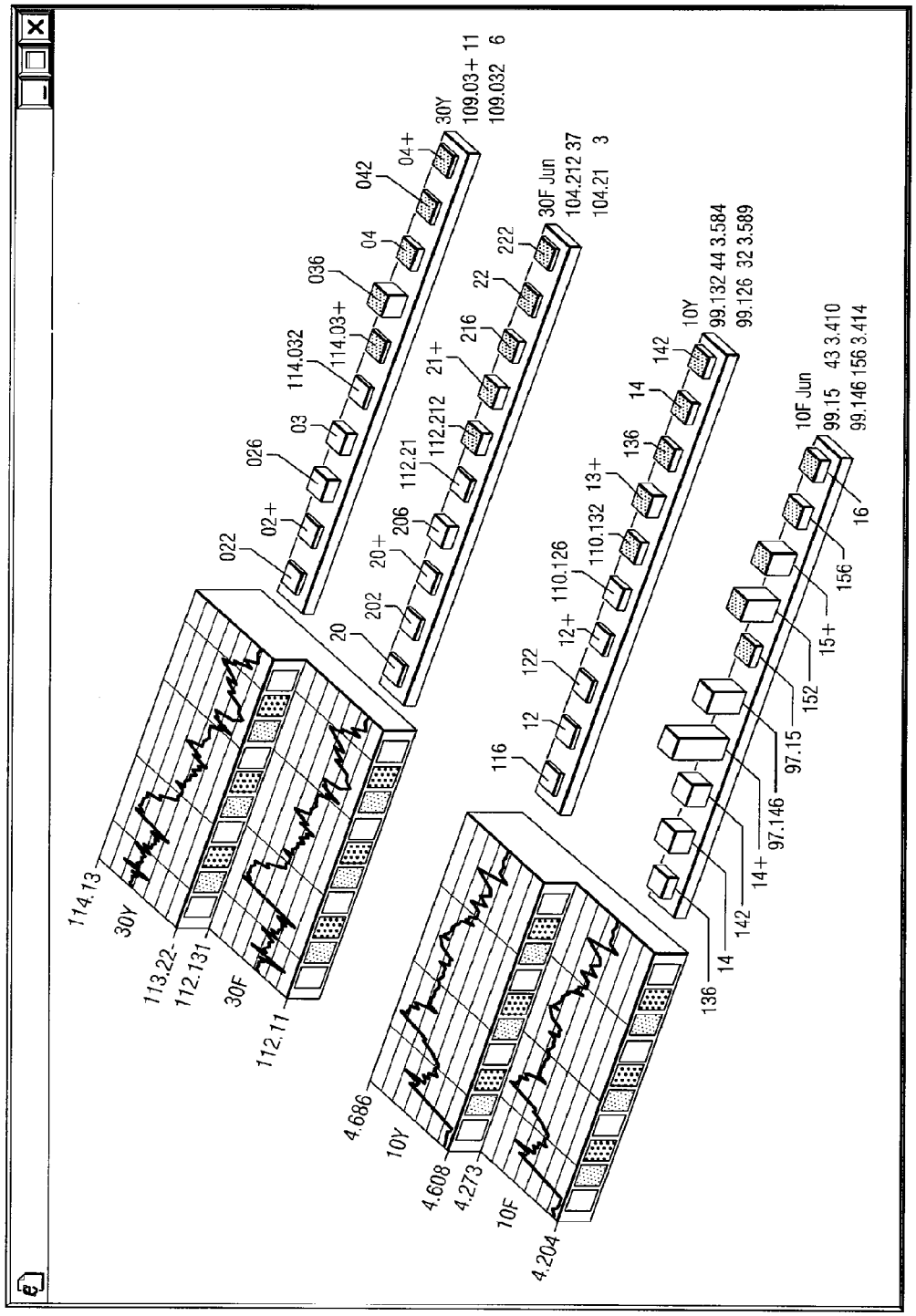
FIG. 7 is an example of a market presentation and an associated graphical depiction for displaying financial market information in accordance with an embodiment of the invention.
Figure 7B:
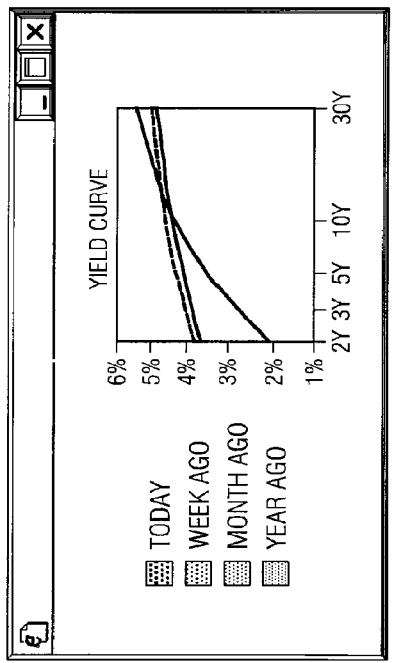
Figure 7C:
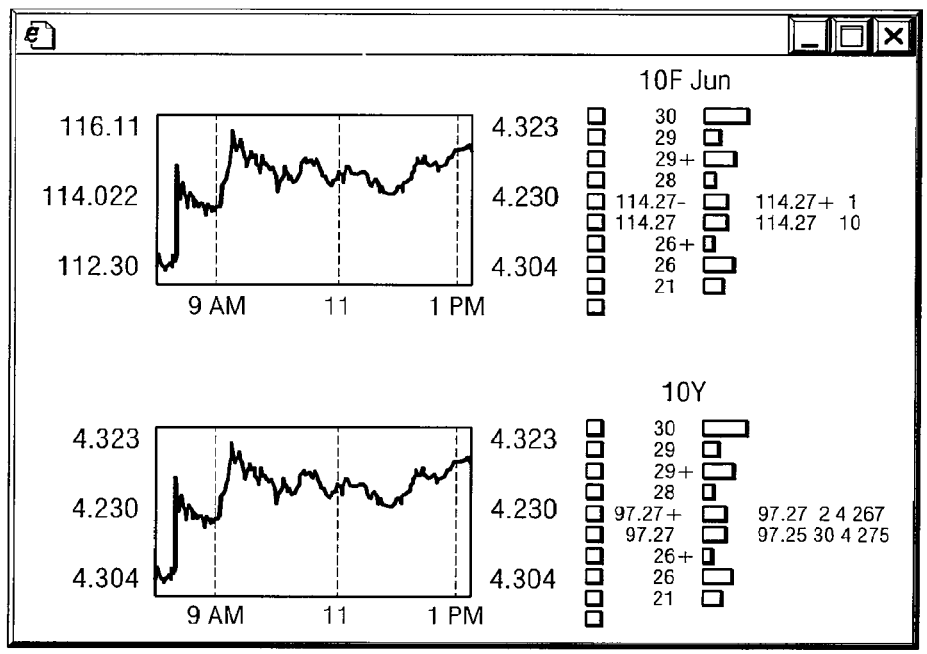
Figure 8C:
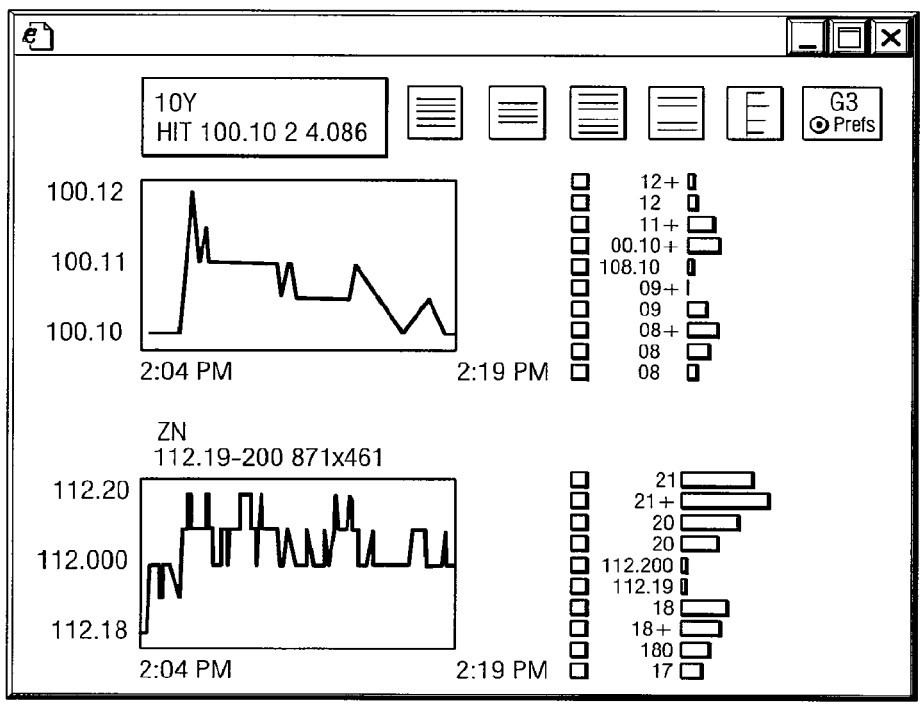
FIG. 8 is an example of a market presentation and an associated graphical depiction for displaying financial market information in accordance with an embodiment of the invention.
Figure 8A:
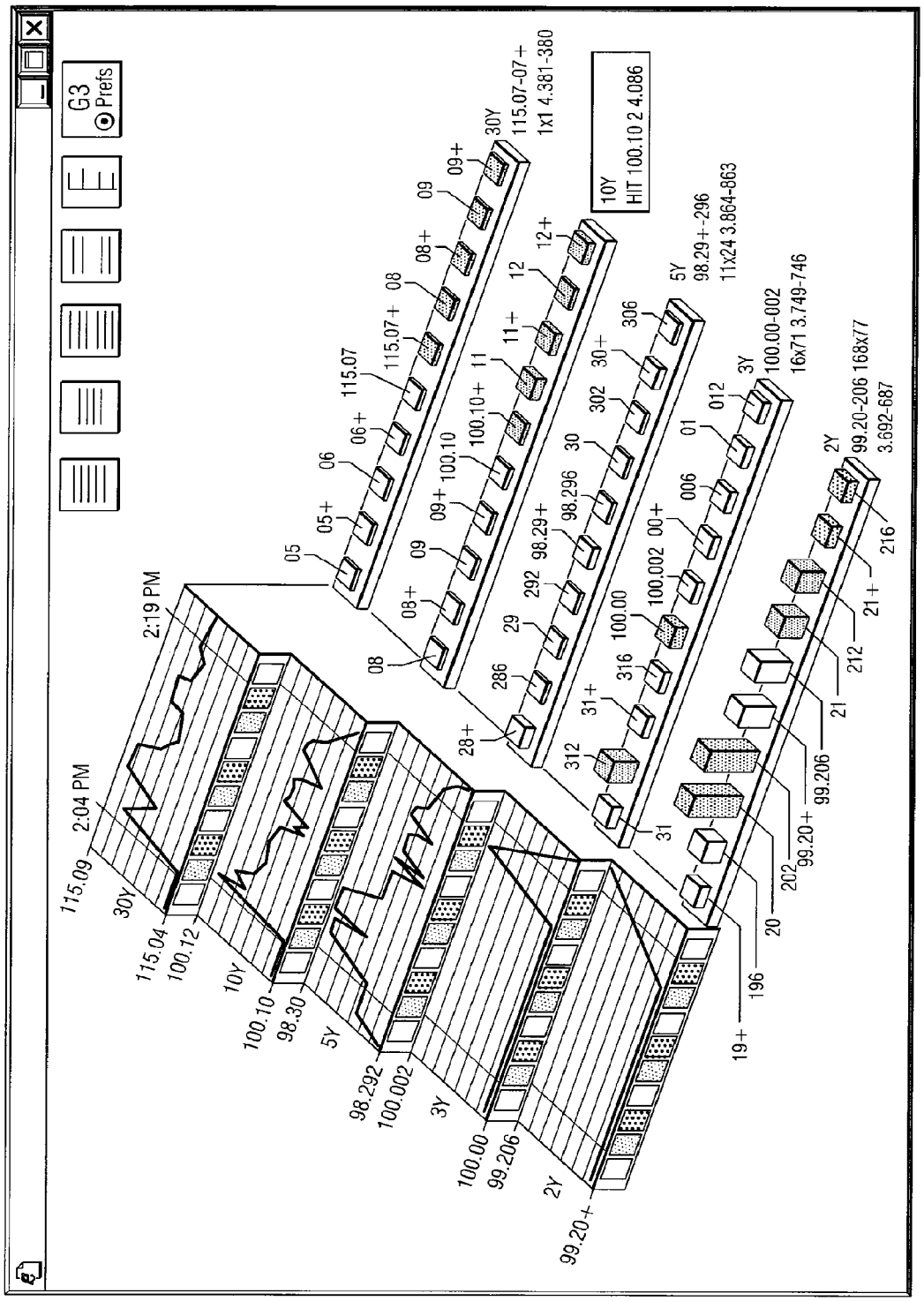
Figure 8B:
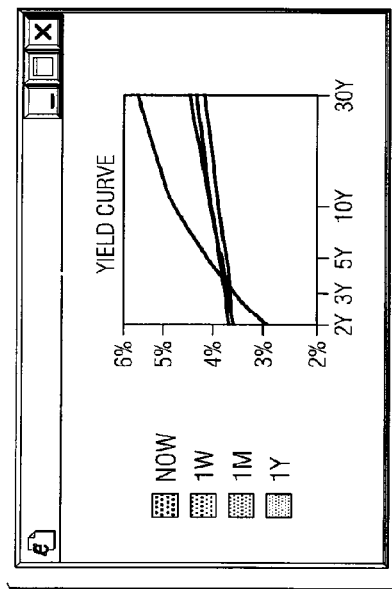

According to another aspect of certain embodiments, the graphical depiction can be manipulated to "break out" certain displayed information and present that information in a different format. For example, a user may select certain limit order books (represented by slabs and their associated market stacks) and display only the selected instruments. As another example, the user can alter the arrangement of the instruments being depicted, such that the user can more easily view and compare certain instruments that are of interest to the user. In FIGS. 7 and 8, the market data for intraday activity is not restricted to a single window. The three-dimensional graphical representation of the futures and treasury data is conveniently displayed in one window while the quote board and yield curve indicator, each of which can be separately closed or manually turned off, are each displayed in their own windows. Moreover, as seen in both FIGS. 7 and 8, additional windows can be opened up to display more in-depth market info. For instance, FIG. 7 depicts how graphs for both the 10F future and 10Y treasury can be individually selected by the user, allowing them to be analyzed side-by-side over the same time period.

As another example, the user may select multiple instruments and have certain information relevant to those instruments displayed in a different format, such as a two-dimensional format. An example of this possible representation of information is shown in FIG. 9. In that screen shot there is displayed an intraday trading line graph for a 10F future and a 10Y treasury. There is also shown an intraday trading line graph comparing the selected future with the selected treasury. Also shown are price trend indicators (e.g., tick strips) for the future and the treasury as well as two-dimensional representations of associated market stacks. Also shown are two-dimensional graphical, numerical, and bar chart indicators of basis information.

To the contrary of FIGS. 1-9, which show market data presented in three-dimensional representations, FIG. 10 depicts market data in two dimensions. The information displayed may result, for example, from a user selecting a particular section or area within one of the three-dimensional representations described herein. For instance, by selecting a particular one or more stacks from a three-dimensional representation, the user may view additional detail regarding those stacks.

Other aspects may also be included as follows. For example, in another embodiment, the invention can require a user to be authenticated in order to see the full range of data content and features provided by the market presentation. Each feature can be given a permission set, whereby the number of permissions allowed for each user is associated with each user's login or other access code or information. These permission sets can be checked upon each login by a user. When a different user logs into the system, the previous features can be cleared, allowing the system to check the new user for the features they are authorized to access. The user's access information may be any information including, for example, the user's email address. This access information may be connected to additional user information, some of which includes: name, email address, phone number, account number, and firm name. Another embodiment allows the user the ability to generate summary reports and also to "force off" an individual or group of clients.

In another embodiment of the invention, various features of the application may be displayed in separate windows or attached to a single window. Thus, a user is provided with full flexibility and to maximize screen real estate. A user will be able to arrange the screen layout so as to customize it. At least six display objects are available with this embodiment. These display objects include a navigation control window, a Quote Board, Yield Curve, HTML window to display information available in FIS and CVP, and two instances of Limit Order Books which include history graphic and associated information. These objects are capable of detaching and floating as separate windows whereby a user can arrange the windows on the screen as desired. A user may also show/hide or open/close each window. Furthermore, the invention will save the user's preferences for window arrangement displayed on the screen. This allows a default window arrangement to be displayed when a user logs into the program.

In another version of this embodiment, the six display objects discussed above may be attached, allowing them to be displayed in one window. In this embodiment, a user may not have the ability to change the placement of the objects within the window; but, they are able to show/hide or open/close each object inside that window. Additionally, each window has windows control to minimize, restore, and close.

A further embodiment allows for default settings. If a user has permission for both Treasury and Futures instruments, the system will automatically open with one window displaying a 2×2 market view including the 5Y, 5F, 10Y, and 10F instruments. A second window will display a focus view with 10Y and 10F and the basis information. By contrast, if the user has authorization to only view United States Treasuries, the invention will automatically open up displaying a five instrument market view containing United States treasuries. A second window will open displaying a focus view with 2Y and 10Y treasuries. The Quote Board will display the five United States Treasury Benchmarks, while the Yield Curve will display Yield Curve Change.

In one embodiment of the invention, a user, through the navigation control window, is able to access all features, control window placement, and control instrument selection. Through instrument selection, a user can arrange the Limit Order Boards, allowing them to modify any instruments. This allows the user to select instruments individually, or select standard settings for treasuries and/or futures. By selecting a standard setting for treasuries, the system may automatically select, depending on user preference, either the five United States Treasury Benchmarks or four Treasuries (2Y, 5Y, 10Y, and 30Y) or some other combination of treasuries. By selecting the Futures setting, the invention may automatically select the four Futures contracts. The instrument selection also allows a user to arrange the view including size of window. Additionally, the display can be presented in a 3×3 or 2×3 view, or some other derived configuration.

A further embodiment allows a user to select a display of Yield Curve or Yield Curve Change. For Yield Curve Display, a user may select the number of historic curves to display. Additionally, a user may group instruments by either type (Cash, Futures) or maturity (10Y Cash with 10Y Future).

In another embodiment, a user can select contract month for each future and manipulate the price formatting for each individual market data. In another embodiment, when a trade occurs, the color of the respective price column(s) can change to a predetermined Trade State color. The Trade State color may be based on a timer, the length of which is a user preference, unless another trade occurs prior to the end of timer.

In another embodiment, for intraday trade data, the invention can store trade history, show Display Price data only in Trade Graph, and display the Open, High, Low, Close values in the Quote Board. Furthermore, contracts should roll automatically to active month on the day preceding First Notice Day. This embodiment allows a user to view the front two contract months and view calendar contracts, contracts that trade the two calendar months. A further embodiment allows the details of the Trade State to be displayed, thus communicating to a user the likelihood of price movement following the trade execution. Trading can be visually displayed through the stack, showing Unfilled Size and Excess Buy or Sell Order. This feature is seen as an outline (wire frame) of the available Volume of the Best Bid/Ask (BBA) column prior to the market entering Trade State. This allows a user to understand the total available quantity that remains at the Best Offer during Take or Best Bid during Hit. As Trade Volume increases, the volume frame representing the original Best Bid/Offer may be filled in with darker color used to represent Trade State. If the Buy or Sell Order Volume exceeds the BBA Volume available prior to Trade State, a layer in the color of the Bid above the Take/Ask column Executed Volume is displayed to show Buy Order Excess, or a layer in the color of the Ask above the Hit/Bid column Executed Volume is displayed to show Sell Order Excess. In a further embodiment, the user is allowed to change the color of all Bid/Ask volume columns to the Hit/Take color for all price levels that are included in the trade. Trading Through The Stack may be (for example) allowed up to three levels, that is, two Bid/Ask price increments above/below the BBA.

In another embodiment, the system is capable of displaying basis information. In certain embodiments, information is the relationship between Cash and Futures instruments. Basis types differentiate in conversion factor input and screen display. The conversion factor may be equal to a published value set by an exchange and carried on the system's data feed. Features for Basis may include Trade Differences, wherein the Basis is derived each time either market trades, and summed Net Change Graph, the difference between the Net Change in Cash and the Net Change in Futures. Trade differences can be throttled to calculate only each time either market has a prior change. For summed Net Change Graph, the changes may be based on the same closing time; but, a user may have the option to apply the conversion factor weight to the Net Change. In another embodiment, instrument names change four times per year as the front future contract rolls. This occurs about twenty days prior to contract expiration. While some embodiments may show markets in 32nds and 2/4/6, one embodiment will display in decimal format (i.e., 32.25/32.50/32.75/32.00). The Quote Board may include the four basis instruments with the ability to choose which instruments a user wants to display.

Another embodiment allows both Cash and/or Futures to be displayed in three-dimensional views. The display allows up to six instruments to be viewed (3×3 view). A user can select from various templates, thus allowing them to customize their display. Some of these templates include the ability to display a 3×3 view of two groups of three Limit Order Book slabs and historical graphs with a space between them, or a 2×2 view of two groups of three Limit Order Book slabs and historical graphs with a space between them. The templates also include a default 3×3 view (2Y, 5Y, 10Y Cash and 2F, 5F, 10F Futures) and a default 2×2 view (5Y, 10Y Cash and 5F, 10F Future). A user is also provided with the option to reverse order slabs.

Another embodiment allows a user to change views. The Limit Order Book can be displayed vertically and Intraday Tick Graphs or Limit Order Books can be displayed simultaneously. This allows a user to choose two markets to display in the Focus View. Additionally, at least two Tick Strip can be displayed vertically, the BBA tag can be placed to the right of the Limit Order Book, and the instrument label may be placed at the top of the Limit Order Book slab. Another view allows the spread between the two instruments as defined in Basis and Curve Swaps (T-Swaps) to be viewed in a Display Chart.

Another embodiment allows a user to select and view the Yield Curve or Yield Curve Change graph. The Yield Curve change graph shows the differences between the current value and the curve over a certain period (e.g., yesterday, a week ago, a month ago, and a year ago). Each Curve can be color coordinated to match the time period the curve represents. The Yield Curve Change graph may include a legend, allowing a user to see which time period each color represents. The Yield Curve Change graph includes a Proportional Curve, ensuring the distances between the Benchmarks on the axis are proportional. Moreover, a zero line, representing no change, is clearly marked. A user has the option to either view Yield Curve Change graph, the Yield Curve graph, or hide the graph. The graph color corresponds to the colors used in current Yield Curve. By showing the net change of the curve rather than mere values, a user is able to see curve movements clearly. Additionally, it removes the manual process to post historic values. In a further embodiment, a user is allowed to select time comparison curves to be shown, e.g., overlay, T−1 day and T−1 month graphs.

In another embodiment, the Quote Board provides full quote information, allowing a user to depend exclusively on this application and not require a separate application to display a quote page in a format with which they are familiar. Thus, Futures, Basis, and Market-view data are added to the existing Quote Board. In the Quote Board, a user may group together data in one column or multiple columns. The Quote Board may be arranged to fit a user's preferences. The Quote Board is detachable with its own window controls. Additionally, when a user changes session preference, the Open, High, Low, Close and Net Change values should all change to the selected session. A further embodiment allows a user to normalize Limit Order Books for all instruments. Additionally, a user can normalize the Limit Order Book for orders (e.g., for one Benchmark only or according to other derived criteria).

Another embodiment allows a user more intuitive access to the user preferences dialog menu. This may be accessed by a mouse click. The preference dialog menu allows font control, a View Selection tab allowing a user to activate drop down lists to select contract month (thereby instructing all Futures instruments to use the same contract month), and Limit Order Book tab to set time or duration for coloring of Trade State on Futures. A further embodiment allows a short cut menu to be accessed by clicking on any of the display's windows. This simplifies the use of the system by allowing simple access to the preferences of specific elements.

Moreover, a further embodiment of the present invention allows two instances of the invention to be accessed at the same time. Additionally, the invention can derive History of Basis given infrequent trades and provide trade history of financial instruments within specific marked exchanges.

Although embodiments of the invention and their advantages are described in detail, a person skilled in the art could make various alterations, additions, and omissions without departing from the spirit and scope of the present invention as defined by the appended claims.

What is claimed is:

1. A system, comprising:
   a computer comprising: at least one memory storing software and operable to receive and store financial market information, and at least one processor, wherein the software, when executed by the at least processor, directs the at least one processor to:
   generate a graphical depiction of the financial market information on a display,
      wherein the graphical depiction comprises a multidimensional representation, in at least three dimensions, of market information for at least two financial instruments, the multidimensional representation including for each financial instrument at least a first stack and a second stack, each stack representing a volume of bid orders or a volume of offer orders at a respective price, wherein the at least two financial instruments include financial instruments from at least two classes of financial instruments;
   determine that a user has selected the first stack or the second stack of the first financial instrument or the second financial instrument; and
   based at least in part on the determination, display a transaction window to the user, wherein the transaction window allows the user to submit at least one of a bid to purchase, an offer to sell, a request to purchase, and a request to sell the selected first financial instrument or second financial instrument.

2. The system of claim 1, wherein one of the classes of financial instruments is treasuries and another of the classes is futures.

3. The system of claim 1, wherein the at least two financial instruments may be selected by the user to be displayed as the multidimensional representation.

4. The system of claim 1, wherein an arrangement of the at least two financial instruments may be altered by the user.

5. The system of claim 1, wherein the software, when executed by the at least one processor, further directs the at least one processor to receive a selection of a first one of the at least two financial instruments, and display information associated with the first one.

6. The system of claim 5, wherein the software, when executed by the at least one processor, further directs the at least one processor to receive a selection of a second one of the at least two financial instruments, and display information associated with the second one.

7. The system of claim 6, wherein the first one is a future and the second one is a treasury, and wherein displaying information associated with the second one includes displaying basis information comparing the first one with the second one.

8. The system of claim 1, wherein the software, when executed by the at least one processor, further directs the at least one processor to display comparative information on the display.

9. The system of claim 8, wherein the comparative information comprises of basis information.

10. The system of claim 8, wherein the comparative information comprises of curve swap information.

11. The system of claim 8, wherein the comparative information comprises of trade differences information.

12. The system of claim 8, wherein the comparative information comprises of summed net change information.

13. The system of claim 1, wherein the software, when executed by the at least one processor, further directs the at least one processor to display at least one of basis information, curve swap information, trade differences information, or summed net change information on the display.

14. The system of claim 13, wherein at least two of basis information, curve swap information, trade differences information, or summed net change information are overlayed.

15. The system of claim 1, wherein the software, when executed by the at least one processor, further directs the at least one processor to:
   receive a selection of a first one of the at least two financial instruments; and
   responsive to the selection, display information associated with the first one separately from the graphical depiction.

16. A method, comprising:
   generating by at least one processor a graphical depiction of financial market information on a display,
      wherein graphical depiction comprises a multidimensional representation, in at least three dimensions, of market information for at least two financial instruments, the multidimensional representation including for each financial instrument at least a first stack and a second stack, each stack representing a volume of bid orders or a volume of offer orders at a respective price, and wherein the at least two financial instruments include financial instruments from at least two distinct classes of financial instruments;
   determining by the at least one processor that a user has selected the first stack or the second stack of the first financial instrument or the second financial instrument; and
   based at least in part on the determination, displaying by the at least one processor a transaction window to the user, wherein the transaction window allows the user to submit at least one of a bid to purchase, an offer to sell, a request to purchase, and a request to sell the selected first financial instrument or second financial instrument.

17. The system of claim 16, wherein one of the classes of financial instruments is treasuries and another of the classes is futures.

18. A non-transitory medium having stored thereon software that when executed by at least one processor directs the at least one processor to:

generate a graphical depiction of financial market information on a display;
- wherein the graphical depiction comprises a multidimensional representation, in at least three dimensions, of market information for at least two financial instruments, the multidimensional representation including for each financial instrument at least a first stack and a second stack, each stack representing a volume of bid orders or a volume of offer orders at a respective price,
- wherein the at least two financial instruments include financial instruments from at least two classes of financial instruments;
- determine that a user has selected the first stack or the second stack of the first financial instrument or the second financial instrument; and
- based at least in part on the determination, display a transaction window to the user, wherein the transaction window allows the user to submit at least one of a bid to purchase, an offer to sell, a request to purchase, and a request to sell the selected first financial instrument or second financial instrument.

19. The non-transitory medium of claim 18, wherein one of the classes of financial instruments is treasuries and another of the classes is futures.

20. The non-transitory medium of claim 18, wherein the at least two financial instruments may be selected by the user to be displayed as the multidimensional representation.

21. The non-transitory medium of claim 18, wherein an arrangement of the at least two financial instruments may be altered by the user.

22. The non-transitory medium of claim 18, wherein the software, when executed by the at least one processor, further directs the at least one processor to receive a selection a first one of the at least two financial instruments, and display information associated with the first one.

23. The non-transitory medium of claim 22, wherein the software, when executed by the at least one processor, further directs the at least one processor to receive a selection a second one of the at least two financial instruments, and display information associated with the second one.

24. The non-transitory medium of claim 23, wherein the first one is a future and the second one is a treasury, and wherein displaying information associated with the second one includes displaying basis information comparing the first one with the second one.

25. The non-transitory medium of claim 18, wherein the software, when executed by the at least one processor, further directs the at least one processor to display comparative information on the display.

26. The non-transitory medium of claim 25, wherein the comparative information comprises of basis information.

27. The non-transitory medium of claim 25, wherein the comparative information comprises of curve swap information.

28. The non-transitory medium of claim 25, wherein the comparative information comprises of trade differences information.

29. The non-transitory medium of claim 25, wherein the comparative information comprises of summed net change information.

30. The non-transitory medium of claim 18, wherein the software, when executed by the at least one processor, further directs the at least one processor to display at least one of basis information, curve swap information, trade differences information, or summed net change information on the display.

31. The non-transitory medium of claim 30, wherein at least two of basis information, curve swap information, trade differences information, or summed net change information are overlayed.

32. The non-transitory medium of claim 18, wherein the software, when executed by the at least one processor, further directs the at least one processor to receive a selection of a first one of the at least two financial instruments; and
- responsive to the selection, display information associated with the first one separately from the graphical depiction.

* * * * *